United States Patent
Nakayama et al.

[11] Patent Number: 6,056,509
[45] Date of Patent: May 2, 2000

[54] CONTRA-ROTATING BEARING DEVICE FOR CONTRA-ROTATING PROPELLER

[75] Inventors: Mikihiko Nakayama; Shinichi Ohtani; Kazuhide Ohta, all of Kobe; Masayasu Matsuda, Yokohama; Keiichi Nitta, Kamakura; Satoshi Keirimbo, Hisai; Satoshi Ashida, Kashiba; Hideki Shibuya, Chiba, all of Japan

[73] Assignee: Kawasaki Jukogyo Kabushiki Kaisha, Kobe, Japan

[21] Appl. No.: 08/809,339

[22] PCT Filed: Mar. 6, 1997

[86] PCT No.: PCT/JP95/01761

§ 371 Date: Aug. 10, 1998

§ 102(e) Date: Aug. 10, 1998

[87] PCT Pub. No.: WO96/07832

PCT Pub. Date: Mar. 14, 1996

[30] Foreign Application Priority Data

Sep. 8, 1994 [JP] Japan .................................. 6-214701
Aug. 9, 1995 [JP] Japan .................................. 7-222740

[51] Int. Cl.[7] ................................ B63H 5/10; F01D 1/24
[52] U.S. Cl. ........................... 416/128; 416/174; 384/100
[58] Field of Search ..................... 416/128, 129, 416/174, 124; 384/97, 98, 100, 114; 184/6; 440/75, 79, 80, 81, 83

[56] References Cited

U.S. PATENT DOCUMENTS

| | | | |
|---|---|---|---|
| 2,348,274 | 5/1944 | Aker | 384/97 |
| 2,348,275 | 5/1944 | Aker | 384/97 |
| 2,457,999 | 1/1949 | Hulbert | 416/129 X |
| 2,470,560 | 5/1949 | Hoover | 416/127 X |
| 3,167,361 | 1/1965 | Snapp et al. | 384/97 |
| 3,317,254 | 5/1967 | Satterthwaite et al. | 384/97 |
| 3,466,952 | 9/1969 | Greenberg et al. | 384/114 X |
| 3,515,449 | 6/1970 | Harbage, Jr. | 384/97 |
| 3,637,273 | 1/1972 | Orndorff, Jr. | 384/97 |
| 3,889,626 | 6/1975 | Kakihara | 440/112 |
| 3,971,606 | 7/1976 | Nakano et al. | 384/97 |

(List continued on next page.)

FOREIGN PATENT DOCUMENTS 58-217819  12/1983  Japan .

*Primary Examiner*—John E. Ryznic
*Attorney, Agent, or Firm*—Marshall, O'Toole, Gerstein, Murray & Borun

[57] ABSTRACT

A hollow portion is provided on the core of an inner shaft (2) to form an oil feed port (3), a plurality of oil feed holes (4) which are connected with both of the outer peripheral face of the inner shaft (2) within a range (L) of the bearing surface of the inner shaft (2) and the oil feed port (3) are radially provided in a line, and axial oil grooves (5) each of which includes an inner shaft surface side opening portion (4a) of the oil feed hole (4) are provided on the outer peripheral face of the inner shaft to form a contra-rotating bearing device for a contra-rotating propeller which causes the inner shaft (2) and an outer shaft (2) to contra-rotate mutually. In place of the oil grooves, a plurality of concave-convex portions may be formed in the axial direction of a contra-rotating bearing on the inner peripheral face of the bearing and circular portions may be provided on both axial ends of the concavo-convex portions to form the contra-rotating bearing device for a contra-rotating propeller. Thus, a sufficient oil film is formed on the bearing surface of the contra-rotating bearing in an area where the inner shaft and the outer shaft rotate in mutually opposite directions at almost equal speeds so that an excellent bearing function can be obtained.

13 Claims, 18 Drawing Sheets

U.S. PATENT DOCUMENTS

| | | | |
|---|---|---|---|
| 4,295,690 | 10/1981 | Rutz | 384/100 |
| 4,307,918 | 12/1981 | Mohsin | 384/100 |
| 4,366,993 | 1/1983 | Ono et al. | 384/120 |
| 4,514,099 | 4/1985 | John et al. | 384/100 |
| 4,558,960 | 12/1985 | Lehtinen et al. | 384/373 |
| 4,602,873 | 7/1986 | Izumi et al. | 384/99 |
| 4,786,264 | 11/1988 | Asanabe et al. | 440/83 |
| 4,798,480 | 1/1989 | Van Beek | 384/114 |
| 4,828,518 | 5/1989 | Kouda et al. | 440/50 |
| 4,834,559 | 5/1989 | Kalvoda | 384/118 |
| 4,883,367 | 11/1989 | Maruyama | 384/114 |
| 5,017,023 | 5/1991 | Scharrer et al. | 384/114 |
| 5,143,455 | 9/1992 | Squyres | 384/97 |
| 5,169,242 | 12/1992 | Blase et al. | 384/99 |
| 5,374,208 | 12/1994 | Von Bergen et al. | 416/174 X |
| 5,415,476 | 5/1995 | Onishi | 384/114 |
| 5,419,724 | 5/1995 | Wyland et al. | 440/79 |
| 5,456,535 | 10/1995 | Chen et al. | 384/398 |
| 5,746,515 | 5/1998 | Takahashi et al. | 384/115 |
| 5,772,334 | 6/1998 | Parkins et al. | 384/117 |
| 5,795,198 | 8/1998 | Pedone | 440/112 X |

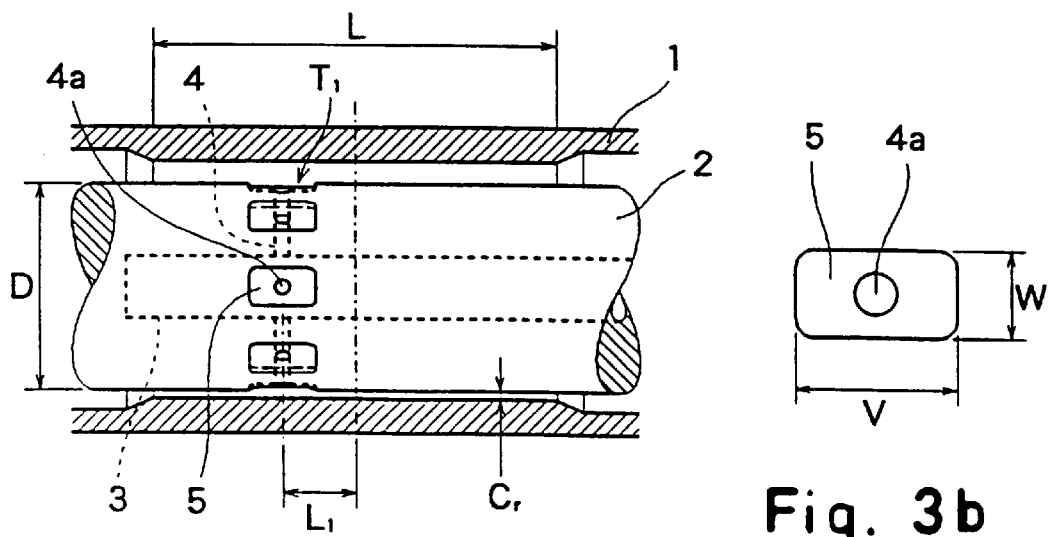
Fig. 3a
Fig. 3b
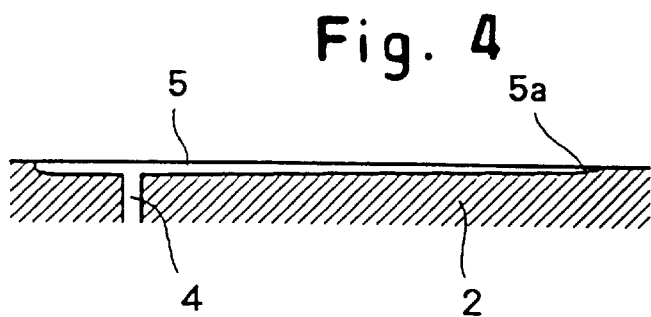
Fig. 4
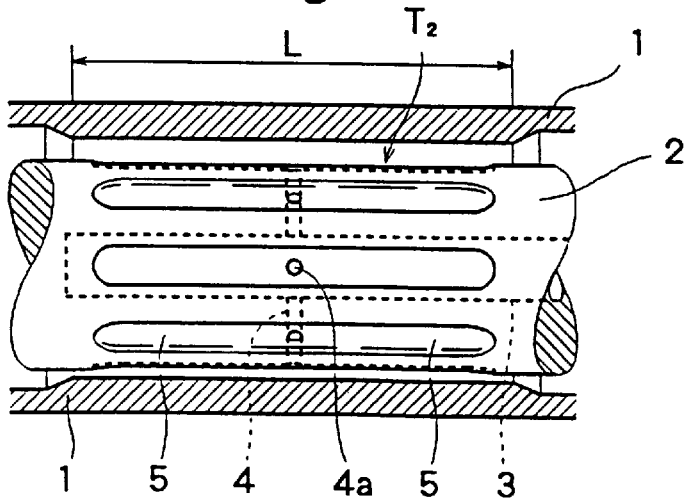
Fig. 5

CONTRA-ROTATING BEARING DEVICE FOR CONTRA-ROTATING PROPELLER

TECHNICAL FIELD

The present invention relates to a contra-rotating bearing device for a contra-rotating propeller wherein a sufficient oil film is formed on the bearing surface of a contra-rotating bearing which supports the inner shaft of the contra-rotating propeller so that an excellent bearing function can be obtained, more specifically to a contra-rotating bearing device for a contra-rotating propeller which can display the bearing function of a contra-rotating bearing when an inner shaft and an outer shaft rotate in mutually opposite directions at almost equal speeds, and more particularly to a contra-rotating bearing device for a contra-rotating propeller which is suitable for a contra-rotating bearing device for a large-sized contra-rotating propeller of a ship or the like.

BACKGROUND ART

Conventionally, a contra-rotating propeller has been known in which an outer shaft having a front propeller and an inner shaft fitted in the outer shaft and having a rear propeller are caused to rotate in mutually opposite directions in order to effectively utilize propeller propulsion energy. Recently, the contra-rotating propeller has been employed in order to enhance the propulsion efficiency of a ship propulsion system.

For example, FIG. 28 is a partial broken side view showing a contra-rotating propeller according to the prior art, and FIG. 29 is a sectional view taken along the line E—E shown in FIG. 28. A contra-rotating propeller 100 includes a hollow outer shaft 102 having a front propeller 101, an inner shaft 104 provided in the outer shaft 102 and having a rear propeller 103, and a main engine 105 for causing the outer shaft 102 and the inner shaft 104 to rotate in mutually opposite directions. The outer shaft 102 has a cylindrical shape, and is rotatably provided on a stern portion 106 of a hull Y through an outer shaft bearing 107 and an outer shaft seal 108. The inner shaft 104 is provided inside the outer shaft 102 through a contra-rotating bearing 109 and an inner shaft seal 110 so as to rotate in the opposite direction. The hull Y is provided with a lubrication oil supply system 111 for supplying lubrication oil to the outer shaft 102, the inner shaft 104, the outer shaft bearing 107 and the contra-rotating bearing 109. A rudder horn 112 and a rudder plate 113 are opposed to the front propeller 101 and the rear propeller 103.

In the contra-rotating propeller 100 having such a structure, an ordinary journal bearing mechanism can be employed as the outer shaft bearing 107 provided between the outer shaft 102 and the stern portion 106. In the contra-rotating bearing 109 which supports the inner shaft 104 that rotates in the outer shaft 102 in the opposite direction, particularly as shown in FIG. 29, however, in the case where the inner shaft 104 rotates clockwise and the contra-rotating bearing 109 such as a plain bearing which is fixed to the outer shaft 102 and the inner peripheral face thereof rotates counterclockwise, there is a possibility that lubrication oil cannot form an oil film between the outer peripheral face of the inner shaft 104 and the inner peripheral face of the contra-rotating bearing 109 if the outer shaft 102 and the inner shaft 104 rotate at almost equal speeds. For this reason, it becomes hard for the shafts 102 and 104 to perform hydrodynamic lubrication due to the oil film formation by the lubrication oil supplied from the lubrication oil supply system 111 when the inner shaft 104 and the outer shaft 102 rotate in mutually opposite directions at almost equal speeds as shown in a sectional view of FIG. 30 in which the contra-rotating bearing 109 is provided on the inner peripheral face of the outer shaft. Thus, there is a possibility that the ordinary bearing cannot display the bearing function.

For this reason, in some bearings, a floating bush 114 is provided between the outer shaft 102 and the inner shaft 104 as shown in a sectional view of FIG. 31. And, the floating bush 114 is almost kept stationary between both shafts 102 and 104 so that an oil film is formed between the floating bush 114 and each of the inner shaft 104 and outer shaft 102 to form a contra-rotating bearing. In case of a hydrodynamic bearing using the floating bush 114, however, an oil film which can display the bearing function can be formed during ordinary operation, while the oil film is formed with difficulty during low-speed operation when entering and leaving a port so that metallic contact is sometimes caused on the bearing surface. Furthermore, the inner shaft 104 is bent easily by a cantilever support of the rear propeller 103 so that local contact may be caused on the rear end of the bearing.

In some bearings, a tapered land (not shown) is formed on the inner face of the contra-rotating bearing 109 which supports the inner shaft 104, and a dynamic pressure is generated by a tapered portion of the tapered land to form an oil film so that the inner shaft 104 is lifted up. Also in the case where the tapered land is provided, however, a load carrying capacity generated by the dynamic pressure is small when causing the main engine 105 to start or rotate at a low speed. Consequently, the oil film becomes thinner. Thus, there is a possibility that the inner shaft 104 and the contra-rotating bearing 109 metallically comes in contact with each other on the bearing surface so that the contra-rotating bearing 109 is seized.

As the prior art to solve the above-mentioned problems, "STERN TUBE BEARING SYSTEM OF CONTRA-ROTATING PROPELLER" (Japanese Examined Patent Publication No. 5-45479) which is based on a hydrostatic bearing as shown in a sectional view showing main parts of FIG. 32 has been disclosed, wherein an oil feed hole 116 is formed radially from a concentric hole 115 of the inner shaft 104, and a screw 117 having a small hole for orifice formation or capillary tube restriction is fitted in the oil feed hole 116 to eject high-pressure oil from the oil feed hole 116 toward the contra-rotating bearing surface between the inner shaft 104 and the outer shaft 102 or the contra-rotating bearing 109 so that a load carrying capacity is generated by a static pressure to lift up the inner shaft 104, thereby preventing the local contact of the inner shaft 104. In addition, a contra-rotating bearing has been disclosed in which a plurality of oil feed holes 116 which are radially provided and connected with both of the outer peripheral face of the inner shaft within a range L of the bearing surface of the inner shaft 104 and the concentric hole 115 provided on the core of the inner shaft 104, and the oil feed holes 116 are arranged in a plurality of lines in the longitudinal direction of the inner shaft as shown in sectional views of FIGS. 33 (a) and (b).

In case of above-mentioned contra-rotating bearing, however, the contra-rotating bearing 109 of the outer shaft 102 is circular bearing. For this reason, when the inner shaft 104 and the outer shaft 102 rotate in mutually opposite directions at equal speeds as described above, the circular bearing does not generate a load carrying capacity by the dynamic pressure of the lubrication oil theoretically. Consequently, in case of a high ratio of number of revolutions in which the inner shaft 104 and the outer shaft 102

(contrarotating bearing 109) rotate in mutually opposite directions at almost equal speeds, there is a possibility that an oil film is not formed but seizure is easily caused when the static pressure oil supply from the radial oil feed hole 116 is not performed due to blackout or the failure of an oil feeding pump of the lubrication oil supply system 111.

In case of the high ratio of number of revolutions, the load carrying capacity generated by the dynamic pressure is insufficient as described above. For this reason, it is necessary to supply the lubrication oil from the radial oil feed hole 116 with a comparatively high static pressure. Consequently, the size of the lubrication oil supply system 111 becomes larger. Furthermore, a lot of oil feed holes 116 are provided on the inner shaft 104 to form the static pressure bearing. For this reason, the strength of the inner shaft 104 is sometimes lowered. In such a case, it is necessary to increase an inner shaft diameter in order to maintain the strength of the inner shaft. Consequently, a weight is increased and the size of a propulsion unit becomes larger.

The present invention has been made in order to provide a contra-rotating bearing device for a contra-rotating propeller wherein a sufficient oil film is formed on the bearing surface of a contra-rotating bearing which supports an inner shaft in the contra-rotating propeller so that an excellent bearing function can be displayed.

It is an object of the present invention to provide a contra-rotating bearing device for a contra-rotating propeller which can lubricate the contra-rotating bearing by using a small number of oil feed holes without reducing the strength of the inner shaft.

It is another object of the present invention to provide a contra-rotating bearing device for a contra-rotating propeller which can supply lubrication oil having a pressure which is necessary within the range of the bearing surface of the inner shaft by simple working.

It is yet another object of the present invention to provide a contra-rotating bearing device for a contra-rotating propeller which can particularly give a load carrying capacity to the contra-rotating bearing during uniform contra-rotation in which an inner shaft and an outer shaft rotate in mutually opposite directions at almost equal speeds, or in the state close thereto.

It is a further object of the present invention to provide a contra-rotating bearing device for a contra-rotating propeller to surely keep a load carrying capacity by supporting the inner shaft with only the load carrying capacity generated by the dynamic pressure of the lubrication oil in the high rotation area of an engine and by increasing an oil feeding pressure to add a static pressure in a low rotation area in which it is hard to generate the sufficient load carrying capacity by only the dynamic pressure.

It is a further object of the present invention to provide a contra-rotating bearing device for a contra-rotating propeller which can generate the sufficient load carrying capacity with a low oil feeding pressure by using the non-circular shape of the contra-rotating bearing.

SUMMARY OF THE INVENTION

In order to accomplish these objects, the present invention takes note that oil grooves are provided on an inner shaft and tapered lands or circular arc portions are formed on the outer peripheral face of the inner shaft, and provides a contra-rotating bearing device for a contra-rotating propeller comprising an inner shaft for driving a rear propeller and an outer shaft for driving a front propeller, both shafts rotating in mutually opposite directions, wherein a hollow portion is provided on the core of the inner shaft to form an oil feed port, a plurality of oil feed holes which are connected with the outer peripheral face of the inner shaft are radially provided within the range of the bearing surface of the inner shaft through the oil feed port, and oil grooves each of which includes an inner shaft surface side opening portion of the oil feed hole are provided on the outer peripheral face of the inner shaft. Consequently, lubrication oil fed through the oil feed port of the inner shaft is supplied to the bearing surface through a plurality of the oil feed holes which are provided radially within the range of the bearing surface of the inner shaft and connected with the outer peripheral face of the inner shaft. Therefore, the lubrication oil having a pressure which is necessary for almost the whole range of the bearing surface is supplied by the oil grooves provided on the outer peripheral face of the inner shaft including the inner shaft surface side opening portions of the oil feed holes so that an oil film is formed to support the inner shaft. Thus, the function of the contra-rotating bearing for a contra-rotating propeller for causing both shafts to rotate in mutually opposite directions can be obtained. Accordingly, the contra-rotating bearing which can display the bearing function can he formed with a small number of oil feed holes. Consequently, a reduction in strength of the shaft can be prevented and processing can be performed easily to decrease working manhour. Thus, the manufacturing time and the manufacturing costs for the contra-rotating bearing can he reduced greatly.

The plurality of oil feed holes are radially provided in a line, and axial oil grooves each of which includes an inner shaft surface side opening portion of the oil feed hole are provided on the outer peripheral face of the inner shaft. Consequently, the lubrication oil fed through the oil feed port is supplied to the bearing surface through the oil feed holes which are radially provided in a line within the range of the bearing surface of the inner shaft and connected with the outer peripheral face of the inner shaft. Therefore, the lubrication oil having a pressure which is necessary for almost the whole range of the bearing surface is supplied by the axial oil grooves provided on the outer peripheral face of the inner shaft including the inner shaft surface side opening portions of the oil feed holes so that the inner shaft can be supported.

The plurality of oil feed holes are radially provided, the oil feed hole being axially provided in a plurality of lines, and circumferential oil grooves or axial oil grooves each of which includes an inner shaft surface side opening portion of the oil feed hole are provided on the outer peripheral face of the inner shaft. Consequently, the lubrication oil fed through the oil feed port is supplied to the bearing surface through the oil feed holes which are radially provided within the range of the bearing surface of the inner shaft and axially provided in a plurality of lines, and connected with the outer peripheral face of the inner shaft. Therefore, the lubrication oil having a pressure which is necessary for almost the whole range of the bearing surface is supplied by the circumferential or axial oil grooves which are provided on the outer peripheral face of the inner shaft including the inner shaft surface side opening portions of the oil feed holes so that the inner shaft can be supported.

The oil feed holes which are axially provided in a plurality of lines are offset circumferentially. Consequently, the lubrication oil having a necessary pressure is easily supplied efficiently to almost the whole range of the bearing surface through the oil feed holes. Thus, the inner shaft can be supported.

The cross-sectional area of the oil groove is formed so as to be decreased from the inner shaft surface side opening portion of the oil feed hole to ends thereof. Consequently, the cross-sectional area of the oil groove can be formed so as to be decreased from the inner shaft surface side opening portion of the oil feed hole to ends thereof. Accordingly, the pressure of the lubrication oil can be optimized within the range of the bearing surface by changing the cross-sectional area of the oil groove. Thus, a contra-rotating bearing device which generates an oil pressure according to a load within the range of the bearing surface can be formed.

The present invention provides a contra-rotating bearing device for a contra-rotating propeller comprising an inner shaft for driving a rear propeller and an outer shaft for driving a front propeller, both shafts rotating in mutually opposite directions, wherein a plurality of tapered lands are formed on the outer peripheral face of the inner shaft within the range of the bearing surface of the inner shaft. Consequently, the lubrication oil forms an oil film by the tapered land provided on the outer peripheral face of the inner shaft within the range of the bearing surface of the inner shaft so that the inner shaft can be supported. Thus, necessary processing can be performed easily to decrease working manhour so that the manufacturing time and the manufacturing costs for the contra-rotating bearing can be reduced greatly.

A hollow portion is provided on the core of the inner shaft to form an oil feed port, a plurality of oil feed holes which are connected with both of the outer peripheral face of the inner shaft and the oil feed port are radially provided, and an inner shaft surface side opening portion of the oil feed hole is provided on a valley part of a tapered portion of the tapered land. Consequently, the lubrication oil is fed from the oil feed port provided on the core of the inner shaft to the inner shaft surface side opening portions provided on the valley parts of the tapered portions of the tapered lands through a plurality of the oil feed holes. Thus, a contra-rotating bearing device which can always supply the lubrication oil having a necessary pressure to the tapered portion can be formed.

The present invention provides a contra-rotating bearing device for a contra-rotating propeller comprising an inner shaft for driving a rear propeller and an outer shaft for driving a front propeller, both shafts rotating in mutually opposite directions, wherein a plurality of circular arc portions are formed on the outer peripheral face of the inner shaft within the range of the bearing surface of the inner shaft. Consequently, an oil film is formed by the circular arc portions formed on the outer peripheral face of the inner shaft within the range of the bearing surface of the inner shaft with the lubrication oil so that the inner shaft is supported. Thus, necessary processing can be performed easily to decrease working manhour so that the manufacturing time and the manufacturing costs for the contra-rotating bearing can be reduced greatly.

The present invention takes note that the inner peripheral face of the contra-rotating bearing has the non-circular shape to generate a dynamic pressure together with the inner shaft and a non-circular shaped portion of the contra-rotating bearing is enclosed by circular portions, and provides a contra-rotating bearing device for a contra-rotating propeller comprising an outer shaft having a front propeller, an inner shaft which is fitted in the outer shaft, rotates in the direction opposite to the outer shaft and has a rear propeller, and a contra-rotating bearing provided between the inner shaft and the outer shaft, wherein an oil feed port is provided by forming a hollow portion on the inner shaft, and a plurality of radial oil feed holes which are connected with the oil feed port are formed, lubrication oil is fed from the inner shaft to the inner peripheral face of the bearing through the oil feed port and the radial oil feed holes, a plurality of concavo-convex shaped portions are formed on the inner peripheral face of the bearing in the axial direction of the bearing, and circular portions are provided on both ends of the concavo-convex shaped portions provided in the axial direction of the bearing. Consequently, when the lubrication oil is supplied from the inside of the inner shaft to the surface of the contra-rotating bearing through the radial oil feed holes, a load carrying capacity which wholly approximates a uniform value in the axial direction of the contra-rotating bearing at a static pressure obtained by the lubrication oil fed from the inside of the inner shaft in the direction of the contra-rotating bearing because the concave-convex portions such as tapered lands or lobed bearing surfaces which are formed on the inner peripheral face of the contra-rotating bearing have the non-circular shape. The non-circular shape of the contra-rotating bearing is enclosed by the circular portions formed on both ends of the concavo-convex shaped portion. Consequently, the lubrication oil stored in the concavo-convex shaped portion leaks out to the outside with difficulty so that the inner shaft can be supported effectively. Thus, it is possible to further enhance dynamic pressure performance and static pressure performance which forms an oil film to generate the load carrying capacity.

The concavo-convex shaped portion is a tapered land or lobed bearing surface. Consequently, the load carrying capacity is generated by the dynamic pressure between the inner shaft and the contra-rotating bearing irrespective of the ratio of number of revolutions. Accordingly, it is not necessary to increase the static pressure applied from the radial oil feed holes. Thus, the load carrying capacity can be generated by the dynamic pressure positively and effectively, and a oil feeding pressure can be lowered.

Consequently, inboard power can be saved because it is not necessary to perform static pressure oil feeding from a lubrication oil supply system or a low pressure is enough. Also in the case where the oil is not supplied during blackout so that the load carrying capacity cannot be generated by the static pressure or the front and rear propellers are brought into the free rotation state at a low speed and also in case of a high ratio of number of revolutions where the inner shaft and the outer shaft rotate at almost equal speed, the load carrying capacity can be generated by the dynamic pressure irrespective of the ratio of number of revolutions. Thus, the anti-seizure property can be enhanced more than in the structure of a circular bearing. The number of the concavo-convex shaped portions can be set to an optimum value on the conditions for usage of the bearing irrespective of the number of the radial oil feed holes.

The radial oil feed hole is provided backward from a central position in the axial direction of the bearing by L/6 to L/4 for a length L of the bearing. Consequently, the effect of the static pressure oil supply can be enhanced.

The length of the circular portion is L/48 to 24L/48 for the length L of the bearing. Consequently, the load carrying capacity can be enhanced more by the dynamic pressure and static pressure of the lubrication oil. In particular, it is preferable that the length of the circular portion should be 2L/48 to 10L/48 for the length L of the bearing.

BRIEF DESCRIPTION OF DRAWINGS

FIG. 3 is a view showing an example of dimensions according to the first embodiment in FIG. 1, wherein (a) is a side sectional view and (b) is an enlarged view showing the oil groove.

FIG. 4 is a side sectional view showing another example of the axial section of the oil groove in FIG. 1.

FIG. 5 is a side sectional view showing the second embodiment of the present invention.

DETAILED DESCRIPTION

Preferred embodiments of the present invention will be described below in detail with reference to the drawings.

(I) In the embodiment of the present invention which will be described below, oil grooves are provided on an inner shaft, or tapered lands or circular arc portions are formed on the outer peripheral face of the inner shaft.

(1) The First Embodiment

Figures 1A, 1B:
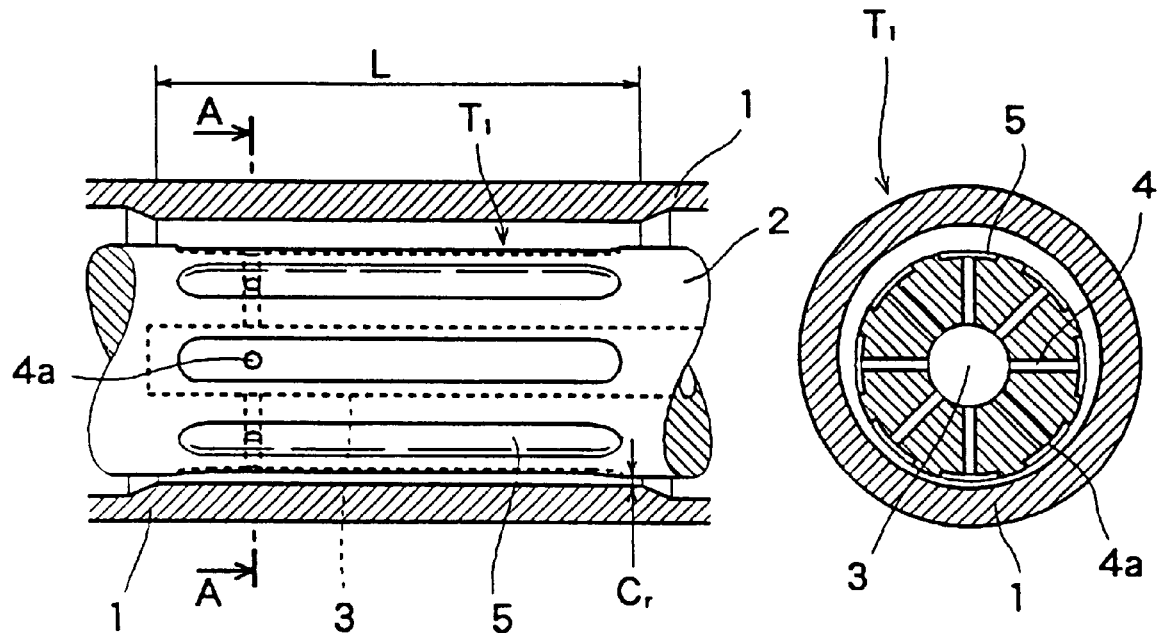
FIG. 1 is a view showing a contra-rotating bearing device for a contra-rotating propeller according to the first embodiment of the present invention, wherein (a) is a side sectional view and (b) is a sectional view taken along the line A—A of (a).

FIG. 1 is a view showing a contra-rotating bearing device T1 for a contra-rotating propeller according to the first embodiment, wherein (a) is a side sectional view and (b) is a sectional view taken along the line A—A of (a). In the drawings for the following description, a radial clearance Cr and the like are exaggerated. In FIG. (a), the right side is the fore direction, and the left side is the after direction.

As shown, an outer shaft 1 for driving a front propeller of the contra-rotating propeller and an inner shaft 2 for driving a rear propeller are provided almost concentrically so as to rotate in mutually opposite directions. The outer shaft 1 is supported by a journal bearing provided on a hull, which is not shown. The inner shaft 2 is supported by the contra-rotating bearing device T1 formed in the outer shaft 1.

In the contra-rotating bearing device T1 according to the first embodiment, a hollow portion is provided on the core of the inner shaft 2 to form an oil feed port 3, and a plurality of oil feed holes 4 which are connected with both of the outer peripheral face of the inner shaft and the oil feed port 3 are provided within a range L of a bearing surface. In the embodiment, the oil feed holes 4 are provided in a line on the rear end side within the range L of the bearing surface, that is, the after side having a greater load on the propeller side. In the first embodiment, eight oil feed holes 4 are radially provided. Axial oil grooves 5 are provided within the range L of the bearing surface on the outer peripheral face of the inner shaft including an inner shaft surface side opening portions 4a of the oil feed holes 4. According to the present embodiment, it is preferable that the number of the oil feed holes 4 should be three or more.

Figures 2A, 2B:
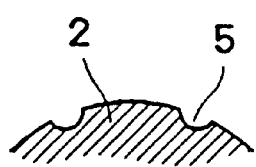
FIGS. 2 (a) and (b) are sectional views showing an oil groove in the circumferential direction shown in FIG. 1.

The oil grooves 5 are formed from a plurality of oil feed holes 4 toward the fore side in the axial direction, and has a structure in which lubrication oil fed from the oil feed holes 4 generates a predetermined oil pressure that is necessary for the range L of the bearing surface along the oil groove 5. The oil groove 5 can be easily processed because it is formed on the surface of the inner shaft 2. As shown by the sectional views of FIGS. 2 (a) and (b), furthermore, the oil groove 5 may be a deep groove in (a) or a groove having a shallow oil reservoir in (b). In other words, it is sufficient that the oil groove 5 can generate a predetermined oil pressure within the range L of the bearing surface.

An example of dimensions obtained by an experiment in the contra-rotating bearing device T1 according to the first embodiment will be described below with reference to the side sectional view of FIG. 3 (a) and the enlarged view showing the oil groove of FIG. 3 (b). The following dimensions are variable depending on the loading conditions of the bearing, whose example will be described.

As shown, the range of the bearing surface (bearing length) is expressed by L, the outer diameter of the inner shaft is expressed by D, a radius clearance is expressed by Cr, the axial length of the oil groove is expressed by v, a width is expressed by w, and oil is fed in eight directions on a section with L/D=2 in this example. Eight oil feed holes 4 are provided in a line in positions apart from the center of the range L of the bearing surface backward by a predetermined distance of L1. An oil groove 5 having an axial length v and a width w is provided around an inner shaft surface side opening portion 4a of the oil feed hole 4. It is preferable that the predetermined distance L1 should be L/6 to L/4, the width w of the oil groove 5 should be πD/32 and the axial length v should be 1w to 2w. It is preferable that the depth of the oil groove 5 should be three to five times as much as the radius clearance Cr. According to general documents, a pressure drop can be ignored when the depth of the oil groove 5 is ten times as much as the radius clearance Cr or more. Consequently, it is supposed that a great change in the pressure is not caused in the oil groove 5 even through the depth of the oil groove 5 is three to five times as much as the radius clearance Cr or more. Therefore, if the position of the oil groove 5 is set, the pressure of the oil groove 5 is not changed greatly even though the position of the opening portion 4a of the oil feed hole 4 is changed axially. Thus, bearing performance is not affected greatly.

As shown by a sectional view of FIG. 4, the oil groove 5 according to the first embodiment may be tapered in such a manner that it gradually becomes shallower from the position where the oil feed hole 4 is provided toward an end 5a, that is, an axial sectional area is decreased from the inner shaft surface side opening portion of the oil feed hole 4 to the end thereof. By such formation, a difference between an oil pressure in the position of the oil feed hole 4 and an oil pressure in the position of the end of the oil groove 5 can be made. Consequently, the oil feed hole 4 is provided in a position where a high oil pressure is necessary within the range L of the bearing surface to reduce the oil pressure in a position apart from the oil feed hole 4 so that the optimum pressure of the lubrication oil can be obtained over the range L of the bearing surface. In order to decrease the cross sectional area of the oil groove 5, a groove width, a groove depth or both of them can be decreased.

The contra-rotating bearing device T1 for a contra-rotating propeller having the above-mentioned structure according to the first embodiment functions as a contra-rotating bearing which supports the inner shaft 2 in the following manner.

More specifically, the oil fed from the oil feed port 3 of the inner shaft 2 is supplied to the inner shaft surface through the oil feed hole 4 and flows into the range L of the bearing surface along the oil groove 5. The contra-rotating bearing device T1 functions to generate a predetermined oil pressure within the range L of the bearing surface so that an oil film is formed and the inner shaft 2 is supported. Thus, the contra-rotating bearing device T1 can be formed by the oil feed holes 4 provided on the inner shaft 2 in a line. Consequently, a small number of oil feed holes 4 are provided on the inner shaft 2 so that the contra-rotating bearing device T1 can be formed without reducing an axial strength.

(2) The Second Embodiment

A contra-rotating bearing device T2 according to the second embodiment will be described below with reference to a side sectional view of FIG. 5. In the second embodiment, the oil feed hole 4 according to the first embodiment is provided in almost the central portion within a range L of a bearing surface. Therefore, the same structures have the same reference numerals as in the first embodiment and their description will be omitted.

As shown, the oil feed hole 4 according to the second embodiment is provided in almost the central portion within the range L of the bearing surface, and an oil groove 5 is provided from the oil feed hole 4 toward the fore and after sides within the range L of the bearing surface.

In case of the second embodiment, the width or depth of the oil groove 5 provided from an opening portion 4a of the oil feed hole 4 toward the fore side and the width or depth of the oil groove 5 provided from the opening portion 4a toward the after side are set to optimum values so that an oil pressure within the range L of the bearing surface can be controlled to obtain an optimum function as the contra-rotating bearing device T2. Also in the second embodiment, the same functions and effects as in the first embodiment can be obtained.

(3) The Third Embodiment

Figures 6A, 6B:
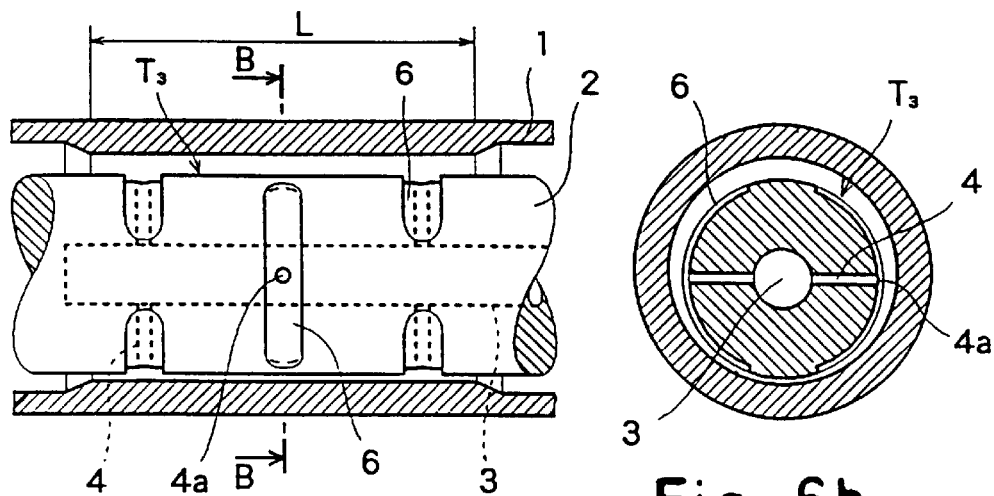
FIG. 6 is a view showing the third embodiment of the present invention, wherein (a) is a sectional view and (b) is a sectional view taken along the line B—B of (a).

A contra-rotating bearing device T3 according to the third embodiment will be described below with reference to a side sectional view in FIGS. 6 (a) and (b) and a sectional view taken along the line B—B in FIGS. 6 (a) and (b). The same structures have the same reference numerals as in the first embodiment and their description will be omitted.

In the third embodiment, oil feed holes 4 are axially provided in a plurality of lines, that is, three lines within a range L of a bearing surface, each line having two oil feed holes 4 as shown. The oil feed holes 4 are provided in positions where the phases of the first and the second lines are shifted (hereinafter referred to as "offset") by 90 degrees in the circumferential direction. The oil feed holes 4 are provided in positions where the second and third lines are offset by 90 degrees. Oil grooves 6 are provided in the circumferential direction within the range L of the bearing surface including inner shaft surface side opening portions 4a of the oil feed holes 4. Also in the third embodiment, the surface of an inner shaft 2 is processed. Consequently, processing can be easily performed in the same manner as in the first embodiment.

The contra-rotating bearing device T3 for a contra-rotating propeller having the above-mentioned structure according to the third embodiment functions to support the inner shaft 2 in the following manner.

More specifically, oil fed from an oil feed port 3 of the inner shaft 2 is supplied from the oil feed holes 4 which are axially provided in a plurality of lines into the range L of the bearing surface, and a predetermined oil pressure is generated on the surface of the inner shaft 2 to form an oil film. Thus, the contra-rotating bearing function can be displayed. Since the propeller is provided on the after side, a load is usually great on the after side. Therefore, it is sufficient that the oil pressure is generated within the range L of the bearing surface corresponding to the load therein by setting the diameters of the oil feed holes 4, the width of the oil groove 6, the depth of the oil groove 6 and the like on the after and fore sides to optimum values. Other functions and effects are the same as in the first embodiment.

(4) The Fourth Embodiment

Figure 7:
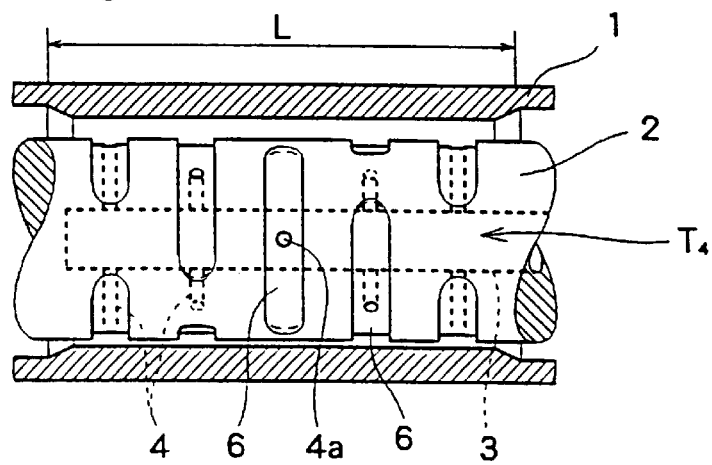
FIG. 7 is a side sectional view showing the fourth embodiment of the present invention.

A contra-rotating bearing device T4 according to the fourth embodiment will be described below with reference to a side sectional view of FIG. 7. In the fourth embodiment, the number of oil feed holes 4 which are axially provided in the third embodiment is increased and the oil feed holes 4 are offset by a predetermined amount. The same structures have the same reference numerals as in the third embodiment and their description will be omitted.

In the fourth embodiment, the oil feed holes 4 are axially provided in a plurality of lines, that is, five lines within a range L of a bearing surface, each line having two oil feed holes 4 as shown. The oil feed holes 4 are provided in such a manner that the first and the second lines are shifted in the circumferential direction, that is offset, by 45 degrees. The second and the third lines are also offset by 45 degrees, and the following lines are sequentially offset by 45 degrees. Oil grooves 6 are provided in the circumferential direction within the range L of the bearing surface including an inner shaft surface side opening portions 4a of the oil feed holes 4. Also in the fourth embodiment, the surface of an inner shaft 2 is processed. Consequently, processing can be easily performed.

The contra-rotating bearing device T4 for a contra-rotating propeller having the above-mentioned structure according to the fourth embodiment functions in the same manner as the contra-rotating bearing device T3 for a contra-rotating propeller in the third embodiment described above.

More specifically, oil fed from an oil feed port 3 of the inner shaft 2 is supplied into the range L of the bearing surface through the oil feed holes 4 which are axially provided in a plurality of lines, and a predetermined oil pressure is operated on the surface of the inner shaft 2 to form an oil film. Thus, the contra-rotating bearing function can be displayed. According to the fourth embodiment, the oil feed holes 4 are axially provided in more lines than in the third embodiment. Consequently, the oil pressure can be controlled corresponding to a load within the range L of the bearing surface. Other functions and effects are the same as in the third embodiment described above.

(5) The Fifth Embodiment

Figure 8:
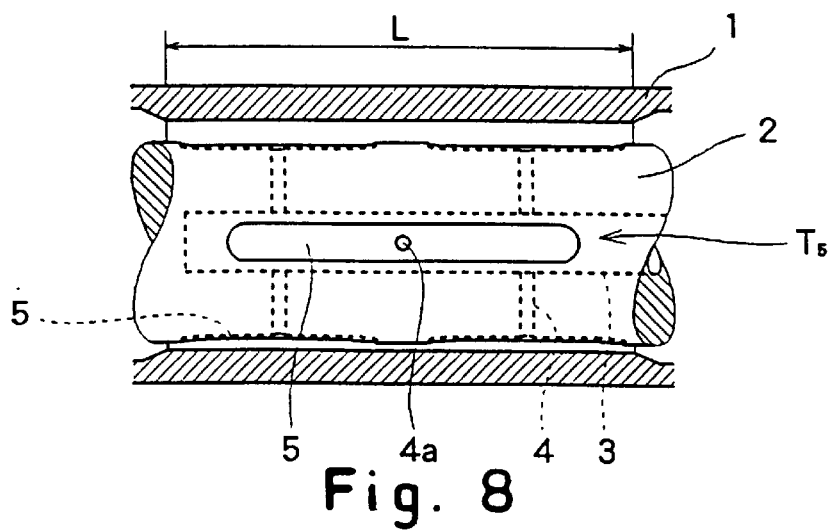
FIG. 8 is a side sectional view showing the fifth embodiment of the present invention.

A contra-rotating bearing device T5 according to the fifth embodiment will be described below with reference to a side sectional view of FIG. 8. In the fifth embodiment, a circumferential oil groove in the third embodiment is changed into an axial oil groove. As shown, oil feed holes 4 are axially provided in a plurality of lines, that is, three lines within a range L of a bearing surface, each line having two oil feed holes 4 in the same manner as in the third embodiment. The oil feed holes 4 are provided in positions where the first and the second lines are circumferentially offset by 90 degrees. The second and the third lines are also offset by 90 degrees. Oil grooves 5 are axially provided within the range L of the bearing surface including inner shaft surface side opening portions 4a of the oil feed holes 4.

The contra-rotating bearing device T5 for a contra-rotating propeller having the above-mentioned structure according to the fifth embodiment functions in the same manner as the contra-rotating bearing device T3 in the third embodiment described above.

More specifically, oil fed from the oil feed port 3 of the inner shaft 2 is supplied into the range L of the bearing surface through the oil feed holes 4 which are axially provided in a plurality of lines, and a predetermined oil pressure is generated on the surface of the inner shaft 2 to form an oil film. Thus, the contra-rotating bearing function can be obtained. Also in the fifth embodiment, the oil pressure corresponding to a load within the range L of the bearing surface can be generated by setting the diameters of the oil feed holes 4, the width of the oil groove 5, the depth of the oil groove 5 and the like on the after and fore sides to optimum values in the same manner as in the third embodiment, or by making the tapered shape as shown in FIG. 4.

(6) The Sixth Embodiment

Figures 9A, 9B:
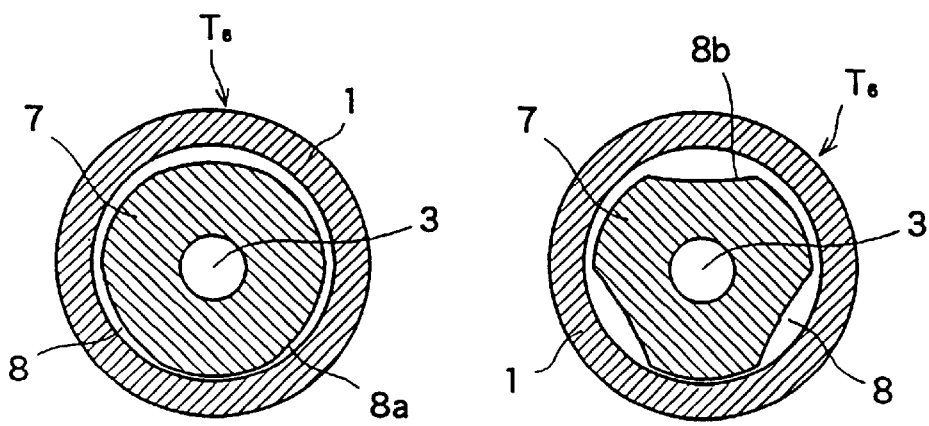
FIGS. 9 (a) and (b) are sectional views showing the sixth embodiment of the present invention.

A contra-rotating bearing device T6 for a contra-rotating propeller according to the sixth embodiment shown in sectional views of FIGS. 9 (a) and (b) will be described below. In the contra-rotating bearing device T6, a tapered land 8 is formed on the outer peripheral face side of an inner shaft 7 which rotates in an outer shaft 1 in the opposite direction. In the present embodiment, the tapered land 8 is formed in three places within a range L of a bearing surface (see L shown in FIG. 1). The tapered land 8 according to the sixth embodiment may be a tapered portion 8a which is curved outward as shown in (a) or a tapered portion 8b which is curved inward as shown in (b). Although the tapered portions 8a and 8b are exaggerated, it is sufficient that they are formed so as to cause dynamic pressure components corresponding to an inner shaft diameter, a load or the like more strongly. An example in which an oil feed port 3 is provided on the core of the inner shaft 7 is described in the present embodiment.

When the inner shaft 7 having the tapered land 8 provided thereon rotates, a dynamic pressure is generated on the tapered portions 8a and 8b. Consequently, an oil film can be formed between the inner shaft 7 and the outer shaft 1 which rotate in mutually opposite directions. Thus, the contra-rotating bearing function can be obtained.

(7) The Seventh Embodiment

Figure 10:
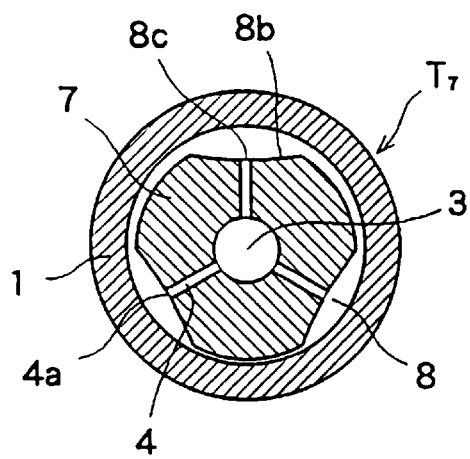
FIG. 10 is a sectional view showing the seventh embodiment of the present invention.

A contra-rotating bearing device T7 for a contra-rotating propeller according to the seventh embodiment shown in a sectional view of FIG. 10 will be described below. According to the contra-rotating bearing device T7, an oil feed port 3 is provided on the core of an inner shaft 7 and an opening portion 4a of a oil feed hole 4 for lubrication oil is provided on a tapered portion 8b of a tapered land 8 in the contra-rotating bearing device T6 according to the sixth embodiment. The oil feed hole 4 which is connected with both of the outer peripheral face of the inner shaft and the oil feed port 3 is provided on a valley part 8c of the tapered portion 8b formed on the inner shaft 7.

By feeding the lubrication oil from the oil feed port 3 to the valley part 8c of the tapered portion 8b, the inner shaft 7 is caused to rotate while always and directly supplying the lubrication oil to the tapered portion 8b which generates a dynamic pressure. Consequently, it is possible to form the contra-rotating bearing device T7 which can generate a predetermined oil pressure, form an oil film easily and has good lubricating effects. It is sufficient that the oil feed hole 4 provided on the tapered portion 8b is set in a position where the relationship between the tapered land 8 and the opening portion 4a of the oil feed hole 4 optimizes a lubricating efficiency.

(8) The Eighth Embodiment

Figure 11:
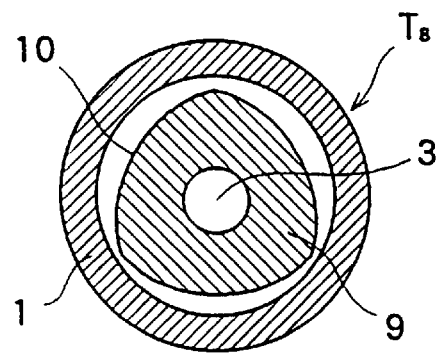
FIG. 11 is a sectional view showing the eighth embodiment of the present invention.

A contra-rotating bearing device T8 for a contra-rotating propeller according to the eighth embodiment shown in a sectional view of FIG. 11 will be described below. In the contra-rotating bearing device T8, three circular arc portions 10 are formed on the outer peripheral face of an inner shaft 9, the inner shaft 9 being formed in an almost triangular section by the circular arc portions 10. The circular arc portions 10 are exaggerated but are actually formed to have a circular arc shape which is close to an inner peripheral circle of an outer shaft 1.

When the inner shaft 9 formed by the three circular arc portions 10 rotates, a dynamic pressure is generated on the circular arc portion 10 so that the contra-rotating bearing function can be obtained in the same manner as in the sixth embodiment.

In the sixth to eighth embodiments, the outer peripheral faces of the inner shafts 7 and 9 are processed. Consequently, processing can be easily performed with high precision so that the necessary processing time can be shortened greatly. While the tapered lands 8 or circular arc portions 10 are provided in three places in the sixth to eighth embodiments, they can be provided in four places or more so as to cause dynamic pressure components corresponding to an inner shaft diameter, a load and the like more strongly.

(II) Embodiments of the present invention which takes note that a dynamic pressure is generated between an inner shaft and an inner peripheral face of a contra-rotating bearing which has a non-circular shape and the non-circular shaped portion of the contra-rotating bearing is enclosed by a circular portion will be described below.

An example of a contra-rotating propeller shafting provided with a contra-rotating bearing device for a contra-rotating propeller according to the present invention will be described below. The same portions have the same reference numerals as in FIGS. 28 to 33 described above according to the prior art, and their description will be omitted.

Figure 12:
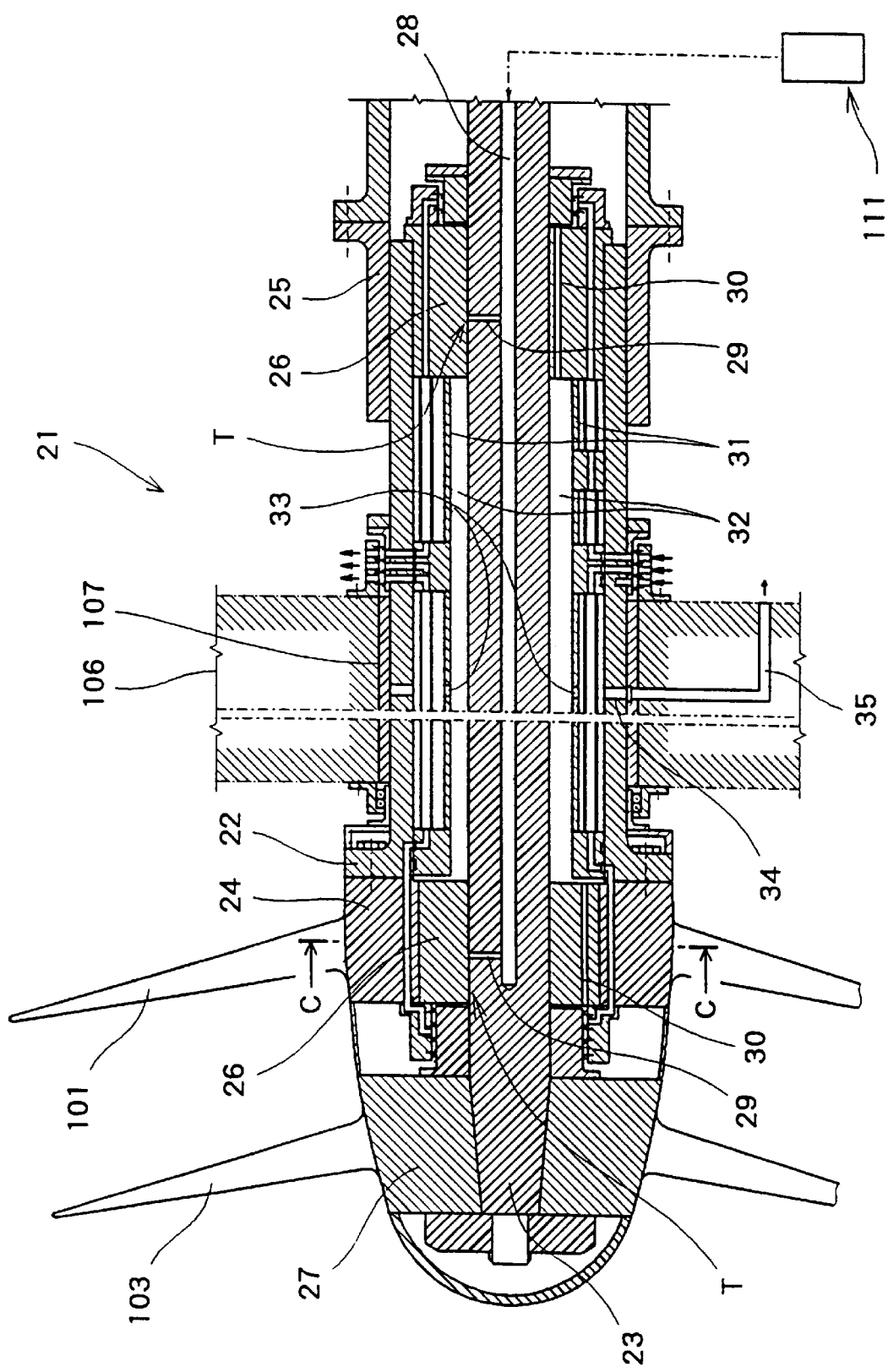
FIG. 12 is a sectional view showing a contra-rotating propeller shafting provided with a contra-rotating bearing device for a contra-rotating propeller according to the embodiment of the present invention.
Figure 13:
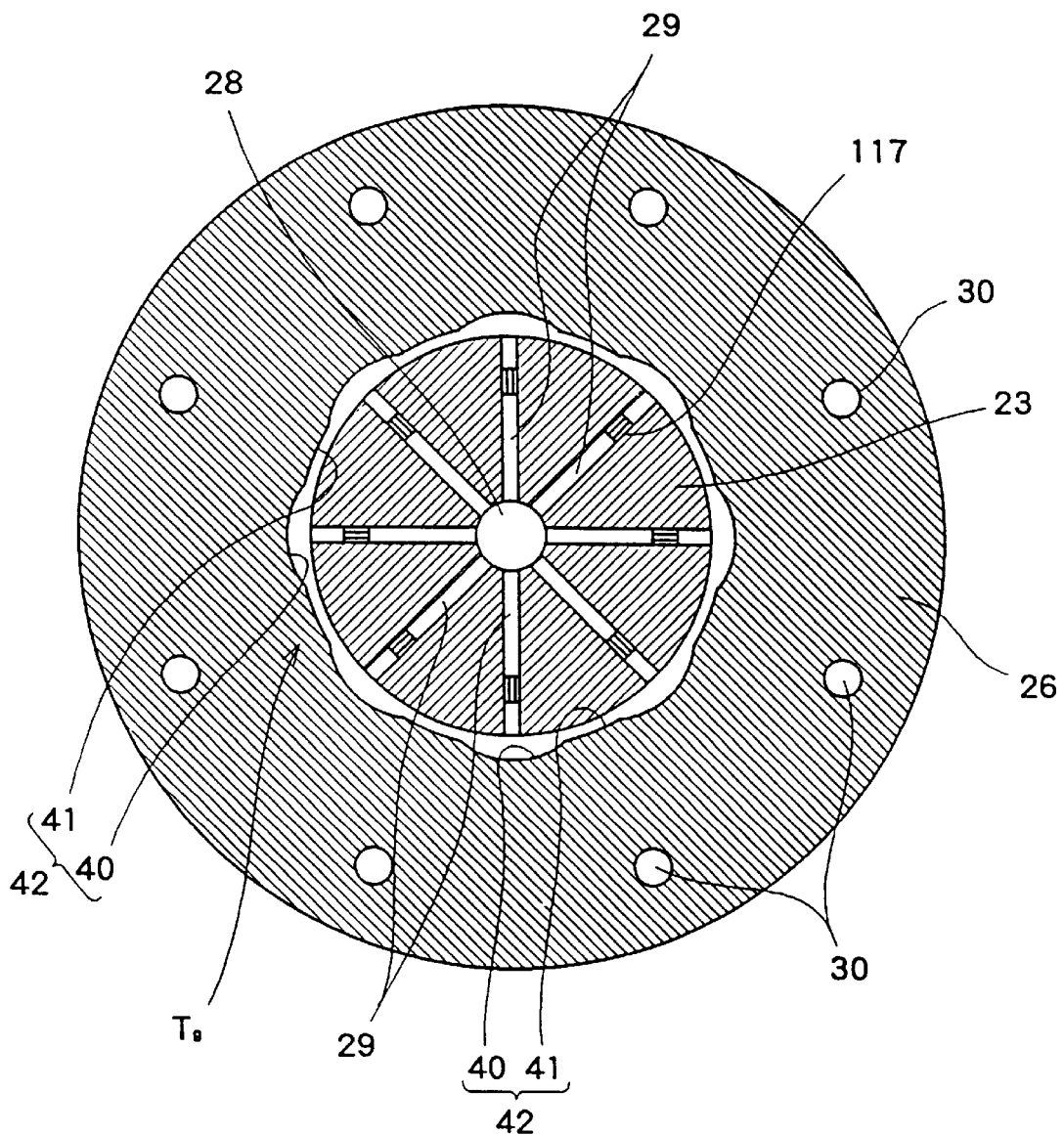
FIG. 13 is a sectional view taken along the line C—C shown in FIG. 12 according to the ninth embodiment of the present invention.

FIG. 12 is a sectional view showing a contra-rotating propeller shafting 21 and a contra-rotating bearing device T according to the present invention. FIG. 13 is a sectional view taken along the line C—C of FIG. 12. As shown in FIG. 12, the contra-rotating propeller shafting 21 includes an outer shaft 22 having a front propeller 101, and an inner shaft 23 having a rear propeller 103. The outer shaft 22 is cylindrical-shaped and is rotatably provided integrally with a front propeller boss 24 of the front propeller 101 and a coupling member 25 through an outer bearing 107. The inner shaft 23 is provided integrally with a rear propeller boss 27 of the rear propeller 103 through a contra-rotating bearing 26 inside the outer shaft 22 and rotatably in the direction opposite to the outer shaft 22. The contra-rotating bearing device T for a contra-rotating propeller according to the present invention is provided on the inner shaft 23 and contra-rotating bearing 26 portions.

More specifically, a hollow portion is provided in the direction of the core of the inner shaft 23 to form an oil feed port 28 to which lubrication oil is supplied from a lubrication oil supply system 111 at a predetermined pressure. As shown in FIG. 13, a plurality of radial oil feed holes 29 are formed in a portion opposed to the contra-rotating bearing 26 of the inner shaft 23 in communication with the oil feed port 28 (In this example, there is a line in the axial direction as shown in FIG. 12, and eight radial oil feed holes 29 are formed in a sectional portion perpendicular to the axial direction, that is, in a portion of the inner shaft 23 as shown in FIG. 13). Thus, lubrication oil can be supplied to the bearing surface between the outer peripheral face of the inner shaft 23 and the inner peripheral face of the contra-rotating bearing 26.

A part of the lubrication oil supplied to the bearing surface flows from a drain port 35 of a stern portion 106 to a tank (not shown) of the lubrication oil supply system 111 through an axial oil path 30 or the contra-rotating bearing 26, a cylindrical path 32 between a cylindrical member 31 for isolation and the inner shaft 23, a diametral communicating hole 33 of the cylindrical member 31 for isolation, an oil drain hole 34 of the outer shaft 22. The lubrication oil which is supplied to the bearing surface and flows in the direction of the cylindrical path 32 merges a part of the lubrication oil described above, and flows from the drain port 35 of the stern portion 106 to the tank through the cylindrical path 32, the diametral communicating hole 33 of the cylindrical member 31 for isolation, the oil drain hole 34 of the outer shaft 22.

(9) The Ninth Embodiment

A contra-rotating bearing device T9 for a contra-rotating propeller according to the ninth embodiment will be described below with reference to FIGS. 13 to 16.

In the contra-rotating bearing device T9 for a contra-rotating propeller shown in FIG. 13, a tapered land 42 in which a curved taper face 40 and a land face 41 are alternately provided is formed at regular angles on a face which is perpendicular to the axial direction on the inner peripheral face of a contra-rotating bearing 26. The curved taper face 40 is formed like a recess by a circular arc having a curvature which is smaller than the curvature of the outer peripheral face of an inner shaft 23. The land face 41 is formed like a circle concentrically with the outer peripheral face of the inner shaft 23.

Figure 14:
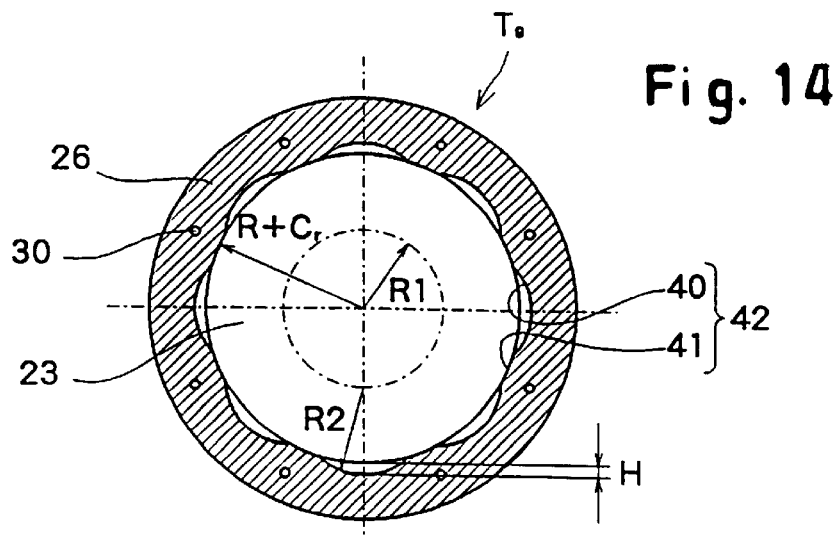
FIG. 14 is a sectional view showing a curved taper face and a land face in FIG. 13 more specifically.

FIG. 14 is a sectional view showing the curved taper face 40 and the land face 41 more specifically. A circle having a radius R2 is further drawn around points for division at equal central angles (8 portions in FIG. 14) on a circumference having an optional radius R1 from the center of the contra-rotating bearing 26 to leave the land face 41 on the inner peripheral face of the contra-rotating bearing 26 so that the curved taper face 40 is formed. By optionally selecting and combining the radii R1 and R2, the curved taper face 40 having a predetermined shape and depth and the land face 41 having a predetermined length can be obtained. It is sufficient that an optimum value is selected for the number of tapered lands 42 depending on the conditions for usage of a bearing irrespective of the number of radial oil feed holes 29.

A maximum depth H of the curved taper face 40 is R1+R2−(R+Cr), wherein a radius of the inner shaft 23 is represented by R and a clearance between the outer peripheral face of the inner shaft 23 and the inner peripheral face of the contra-rotating bearing 26 (radius clearance) is represented by Cr. The maximum depth H of the curved taper face 40 is sometimes changed slightly depending on the number of bearing pads, that is, the number of the tapered lands 42 and operating conditions, and approximates [(1.0 to 3.0)×a diameter (inner diameter) of the contra-rotating bearing 26/10000].

Figure 15:
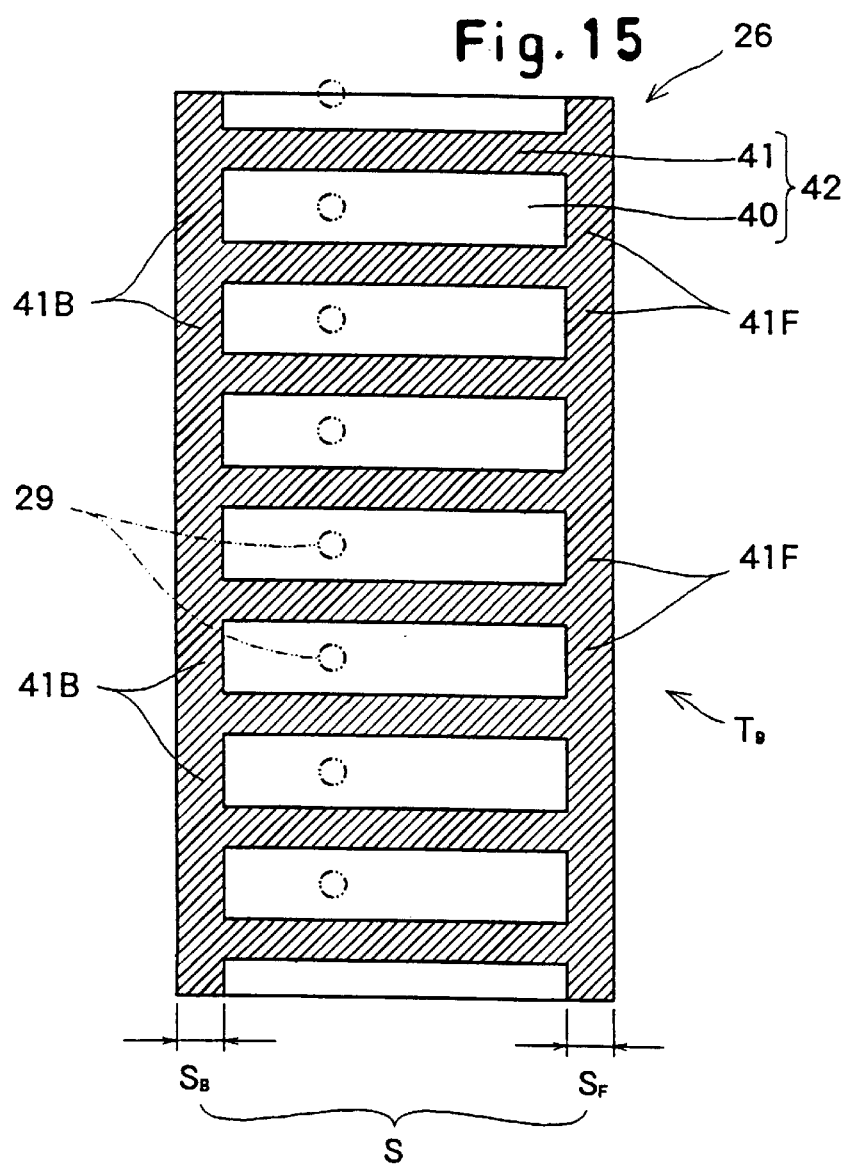
FIG. 15 is a developed view showing a tapered land on the inner peripheral face of the contra-rotating bearing in FIG. 14.

FIG. 15 is a developed view showing the inner peripheral face of the contra--rotating bearing 26. The curved taper faces 40 and the land faces (circular portions) 41 of the tapered lands 42 are alternately formed. A rear side land face 41B (SB on the left side of FIG. 15) and a front side land face 41F (SF on the right side of FIG. 15) are formed with a radius of about (R+Cr) as circumferential circular portions (land faces) having predetermined lengths over the circumference on the same peripheral face as the land face 41 on axial both end sides of the tapered land 42 (right and left sides shown in FIG. 15). The total of these lengths is represented by S.

Figure 16:
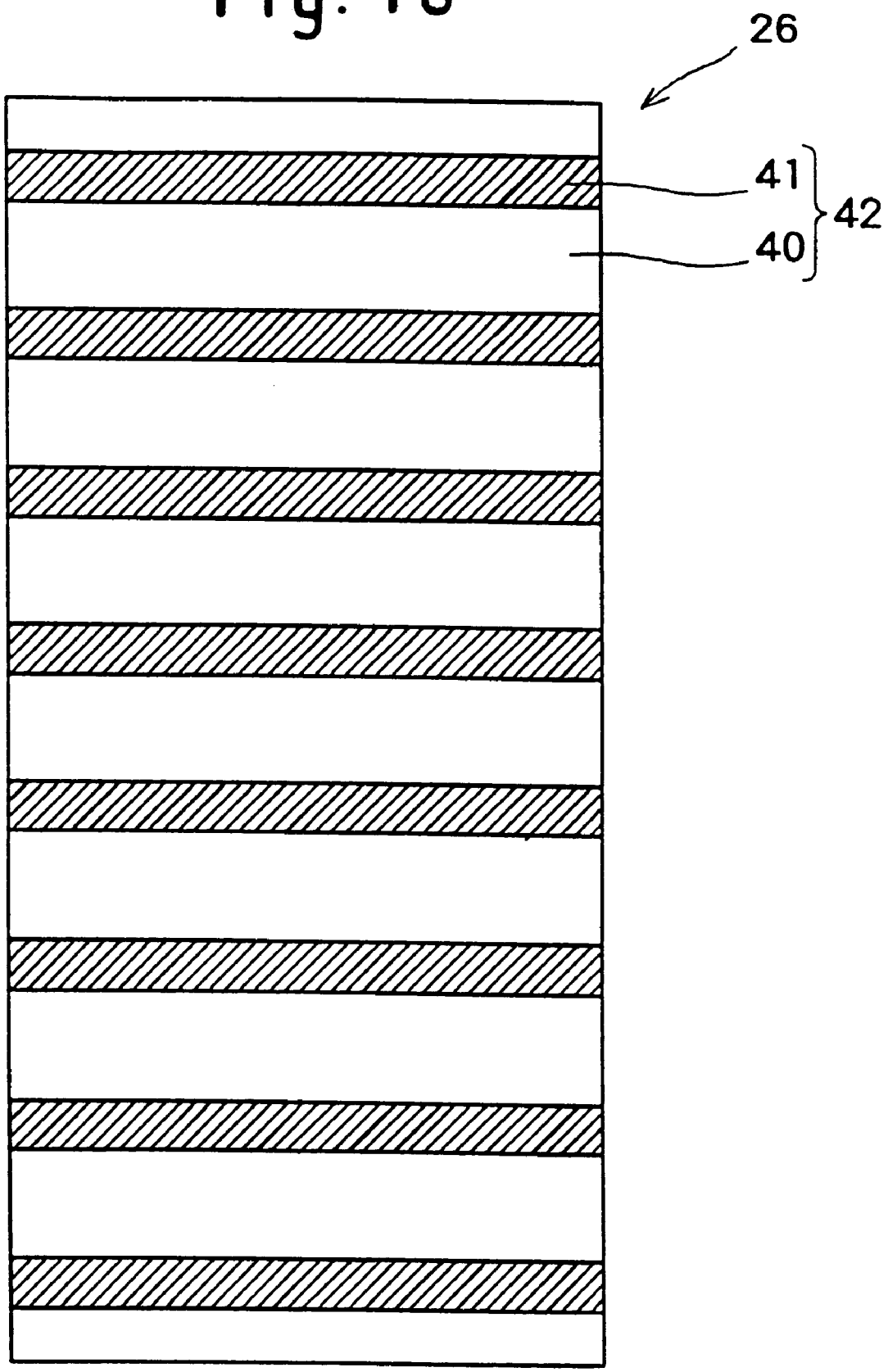
FIG. 16 is a developed view showing the inner peripheral face of the contra-rotating bearing without a rear side land face (circular portion) and a front side land face (circular portion) formed in FIG. 14.

More specifically, the whole circumferential portion of the curved taper face 40 is enclosed by a pair of land faces 41 provided in the circumferential direction and the rear side land face 41B and the front side land face 41F provided in the axial direction on the inner peripheral face of the contra-rotating bearing 26 (a hatching portion shown in FIG. 15 indicates a circular portion, that is, a land face). FIG. 16 is a developed view showing the inner peripheral face of the contra-rotating bearing 26 in which the tapered land 42 does not have the rear side land face 41B and the front side land face 41F (the whole face is the tapered land) as compared with FIG. 15 (a hatching portion shown in FIG. 16 is a land face).

(10) The Tenth Embodiment

Figure 17:
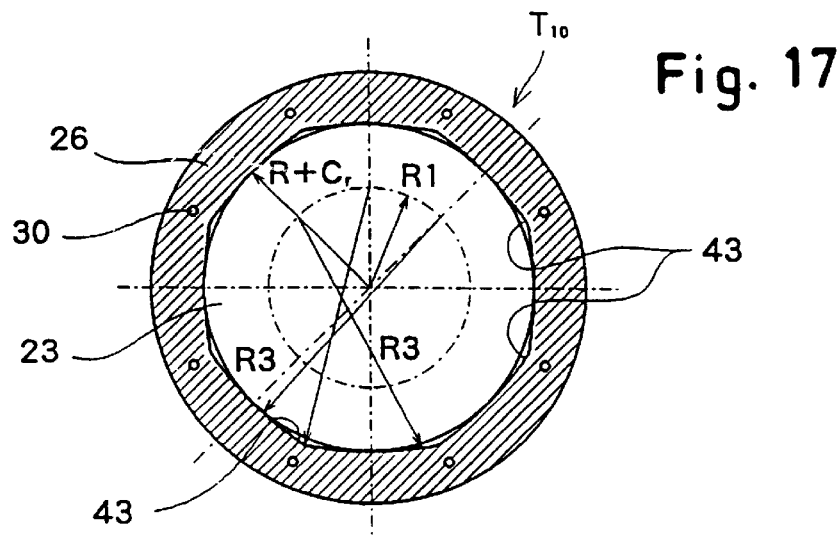
FIG. 17 is a sectional view showing a lobed bearing surface as another example of the non-circular shape on the inner peripheral face of the contra-rotating bearing according to the tenth embodiment of the present invention.

FIG. 17 shows a contra-rotating bearing device T10 for a contra-rotating propeller according to the tenth embodiment, and the same sectional view as in FIG. 14 in which another example of a non-circular shape on the inner peripheral face of a contra-rotating bearing 26 is shown. The structure of the same non-circular shape as the tapered land 42 is slightly different from that of FIG. 14. The inner peripheral face of the contra-rotating bearing 26 is divided into equal parts (for example, 8 parts) and a concave portion is formed on the inner peripheral face between adjacent equal divisional points.

On a circumference having an optional radius R1 from the center of an inner shaft 23, two circles are further drawn with a radius R3 around two points, which are adjacent to each other, of points for division into equal central angles (8 portions in FIG. 17). These circular arcs and the inner peripheral face intersect and a lobed bearing surface 43 (concave portion) corresponding to the tapered land 42 is formed with a predetermined depth and shape between equally divisional points which are adjacent to each other. By optionally selecting and combining the radii R1 and R3, the lobed bearing surface 43 having a predetermined shape and depth can be obtained. It is sufficient that the number of the lobed bearing surfaces 43 is set to an optimum value depending on the conditions for usage of a bearing irrespective of the number of radial oil feed holes 29. As best understood with reference to FIG. 17, a center portion of each lobed bearing surface 43 has a distance from the axis of R+Cr, and therefore provides a land face as described above with respect to the ninth embodiment.

Figure 18:
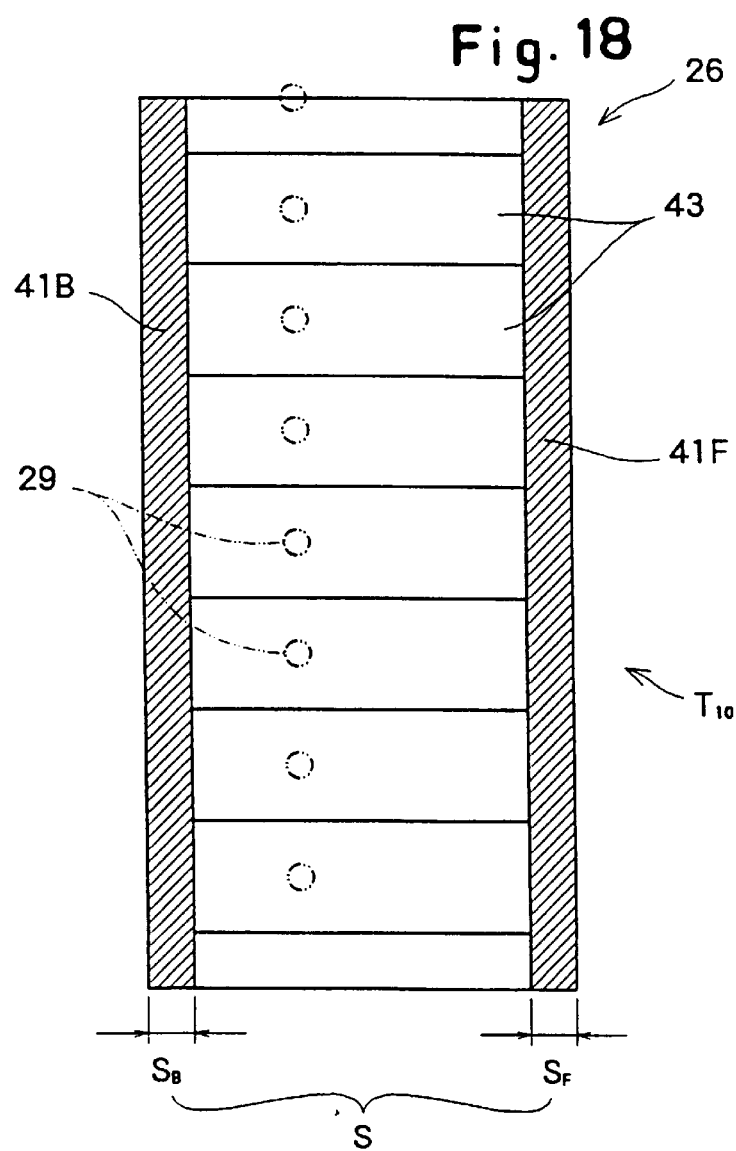
FIG. 18 is a developed view showing the lobed bearing surface on the inner peripheral face of the contra-rotating bearing in FIG. 17.

FIG. 18 is a developed view showing the inner peripheral face of the contra-rotating bearing 26 shown in FIG. 17, in which the lobed bearing surface 43 is formed in the circumferential direction. A rear side land face 41B (SB on the left side of FIG. 18) and a front side land face 41F (SF on the right side of FIG. 18) are formed with a radius of about (R+Cr) as circumferential circular portions (land faces) having predetermined lengths over the circumference on the same peripheral face as the land face 41 on axial both end sides of the lobed bearing surface 43 (right and left sides shown in FIG. 18) in the same manner as in FIG. 15.

Figure 19:
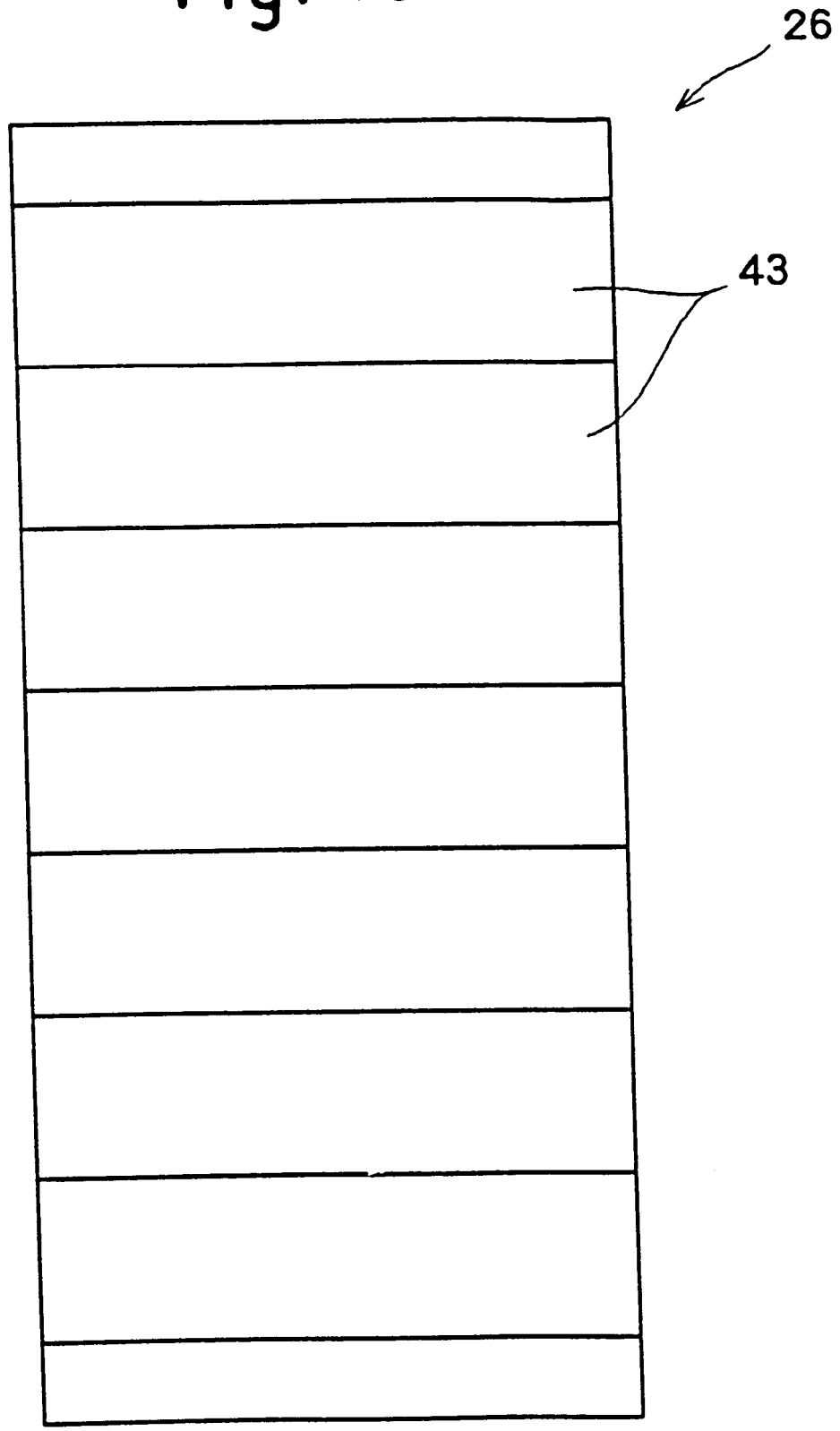
FIG. 19 is a developed view showing the inner peripheral face of the contra-rotating bearing without a rear side land face (circular portion) and a front side land face (circular portion) formed in FIG. 17.

More specifically, the lobed bearing surface 43 has axial both ends enclosed by the rear side land face 41B and the front side land face 41F in the axial direction on the inner peripheral face of the contra-rotating bearing 26 (a hatching portion shown in FIG. 18 indicates a circular portion). FIG. 19 is a developed view showing the inner peripheral face of the contra-rotating bearing 26 in which the lobed bearing surface 43 does not have the rear side land face 41B and the front side land face 41F (the whole face is the lobed bearing surface) as compared with FIG. 18.

Figure 25A:
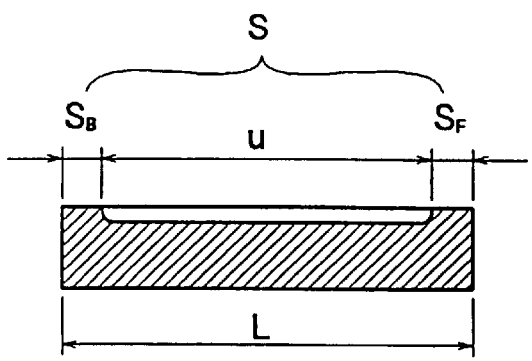
FIG. 25 is a diagram showing the relationship between the rear side land face and the front side land face and the oil film thickness according to the present invention, wherein (a) is a sectional view showing the contra-rotating bearing and (b) is a chart showing the relationship of the oil film thickness.
Figure 25B:
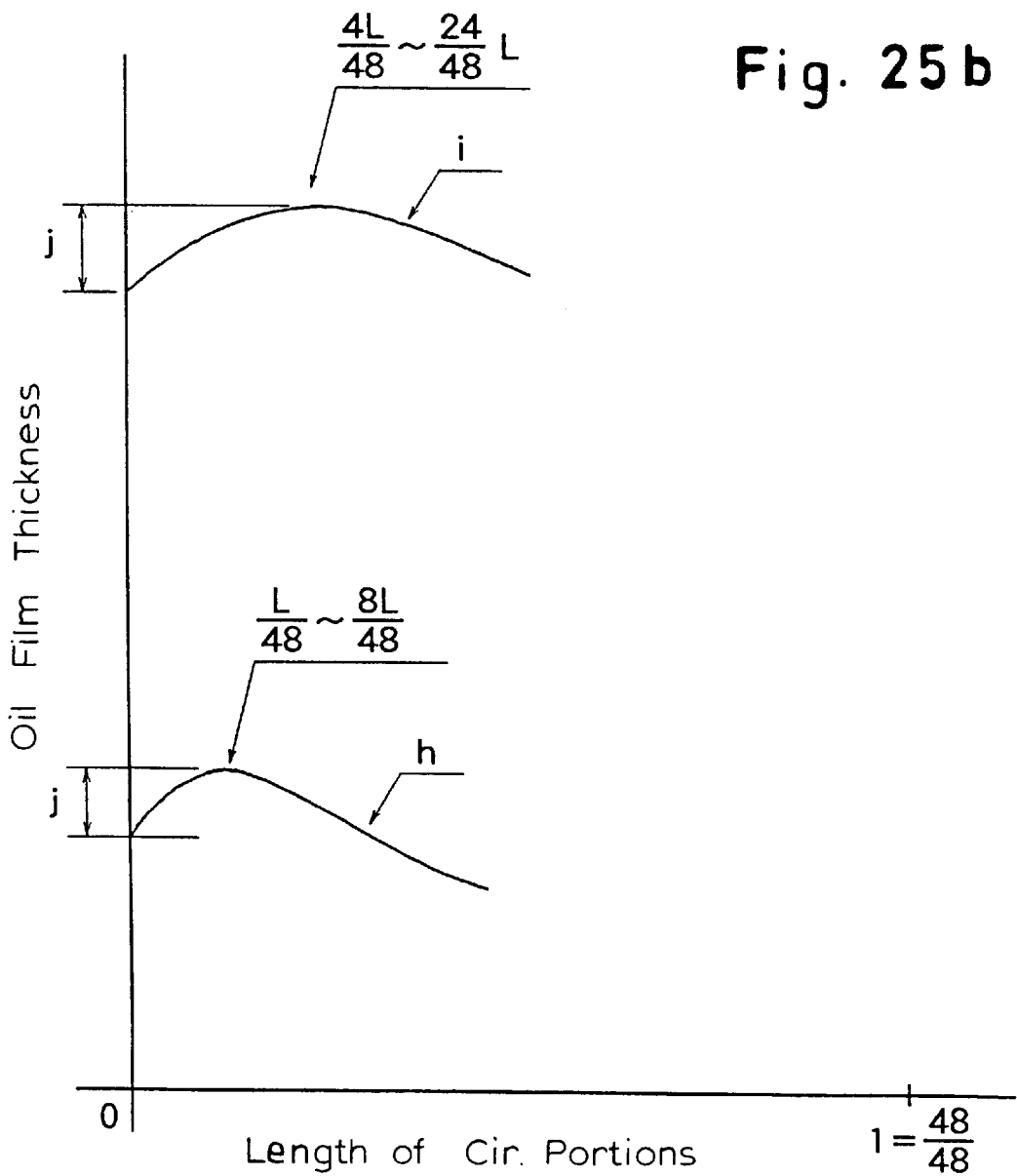

For the total S (in the axial direction of the contra-rotating bearing 26) of the length SB of the rear side land face 41B and the length SF of the front side land face 41F described above in the inner peripheral direction of the contra-rotating bearing 26 shown in FIGS. 15 and 18, it is proper that 2L/48 to 10L/48 is suitable for an axial length L of the contra-rotating bearing 26 in consideration of the enhancement of dynamic pressure performance and static pressure performance by lubrication oil (which will be described below with reference to FIG. 25).

(11) The Eleventh Embodiment

Figure 20:
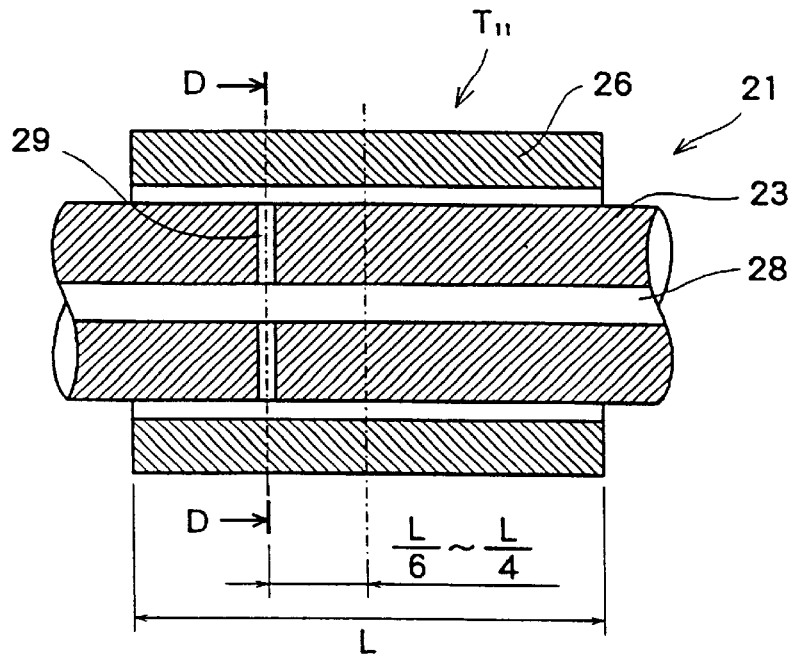
FIG. 20 is a sectional view showing a contra-rotating bearing device portion for a contra-rotating propeller according to the eleventh embodiment of the present invention.
Figure 21:
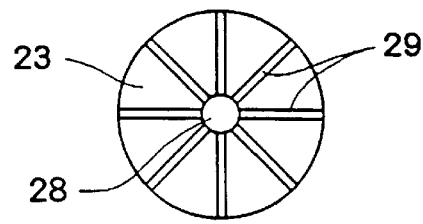
FIG. 21 is a sectional view taken along the line D—D in FIG. 20.

FIG. 20 is a sectional view showing a contra-rotating bearing device T11 for a contra-rotating propeller according to the eleventh embodiment, and FIG. 21 is a sectional view taken along the line D—D shown in FIG. 20. When a position where radial oil feed holes 29 are formed, that is, an optimum position of an oil feeding section is generally placed backward from the central position of a contra-rotating bearing 26 by L/6 to L/4 (in the left direction of FIG. 20), which depends on the weight of a propeller (rear propeller 103) and the diameter of an inner shaft 23, static pressure oil supply can produce better effects.

(12) The Twelfth Embodiment

Figure 22:
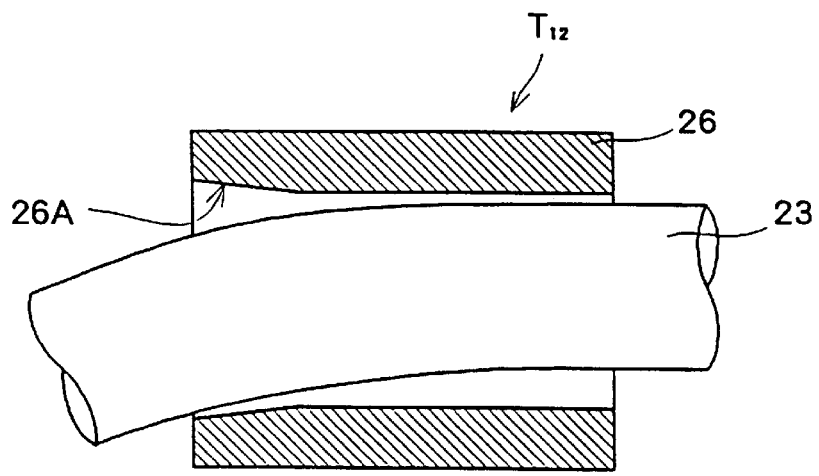
FIG. 22 is a sectional view showing main parts of an inner shaft and ends of a contra-rotating bearing according to the twelfth embodiment of the present invention.

FIG. 22 is a sectional view showing main parts of an inner shaft 23 and ends of a contra-rotating bearing 26 of a contra-rotating bearing device T12 for a contra-rotating propeller according to the twelfth embodiment. If a relative angle of rake of the end of the contra-rotating bearing 26 with the inner shaft 23 is great, local contact is increased. For this reason, the state of relative rake can be relaxed by forming a horn-shaped rake portion 26A on the end of the contra-rotating bearing 26.

The bearing function of the contra-rotating bearing device for a contra-rotating propeller in (II) will be described below.

Figure 23:
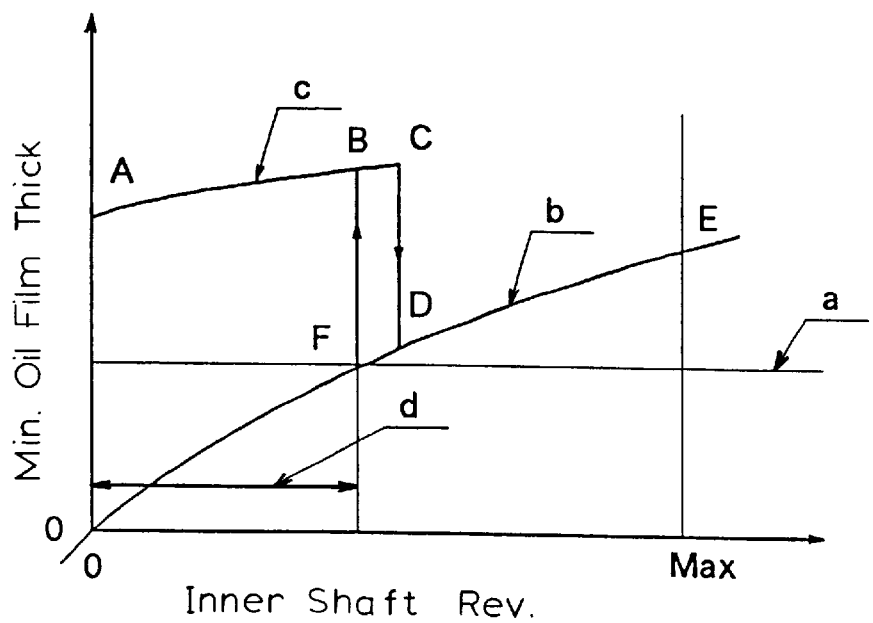
FIG. 23 is a chart showing the relationship between the number of revolutions of the inner shaft and a minimum oil film thickness (load carrying capacity) according to the present invention.

(a) Relationship between the number of revolutions of an inner shaft and a minimum oil film thickness FIG. 23 is a chart showing the relationship between the number of revolutions of the inner shaft 23 and a minimum oil film thickness (load carrying capacity). In FIG. 23, a line a represents "an allowable oil film thickness", a line b represents "a minimum oil film thickness obtained by a dynamic pressure load carrying capacity", a line c represents "a minimum oil film thickness obtained by a (dynamic pressure and static pressure) load carrying capacity", and a line d represents "a dynamic pressure load carrying capacity underarea". When the inner shaft 23 and the contra-rotating bearing 26 rotate at a high speed (for example, a point E), the load carrying capacity is sufficiently generated by a dynamic pressure. Consequently, a necessary oil film thickness can be obtained. Thus, an oil feeding pressure can be reduced to the limit where a rise in temperature of lubrication oil is allowed. In FIG. 23, Max represents "a maximum number of revolutions". The "maximum number of revolutions" means the number of continuous maximum output rotations, that is, the number of revolutions obtained during rated output.

When operating in the dynamic pressure load carrying capacity underarea d, that is, a low rotation area in which the load carrying capacity is insufficiently obtained by the dynamic pressure, control is performed so as to increase the load carrying capacity obtained by the static pressure. When operating for a long time in the vicinity of the number of revolutions in which an oil feeding pump (not shown) of a lubrication oil supply system 111 is turned ON/OFF, the oil feeding pump is always turned ON/OFF every time the number of revolutions is slightly changed on the meteorological conditions on the sea. For this reason, operation control is performed so as to draw hysteresis A-B-C-D-E when increasing the number of shaft revolutions and hysteresis E-D-F-B-A when decreasing the number of shaft revolutions as shown in FIG. 23. Thus, once the oil feeding pump is turned ON, it is not turned OFF even if the number of revolutions is slightly increased.

Figure 24:
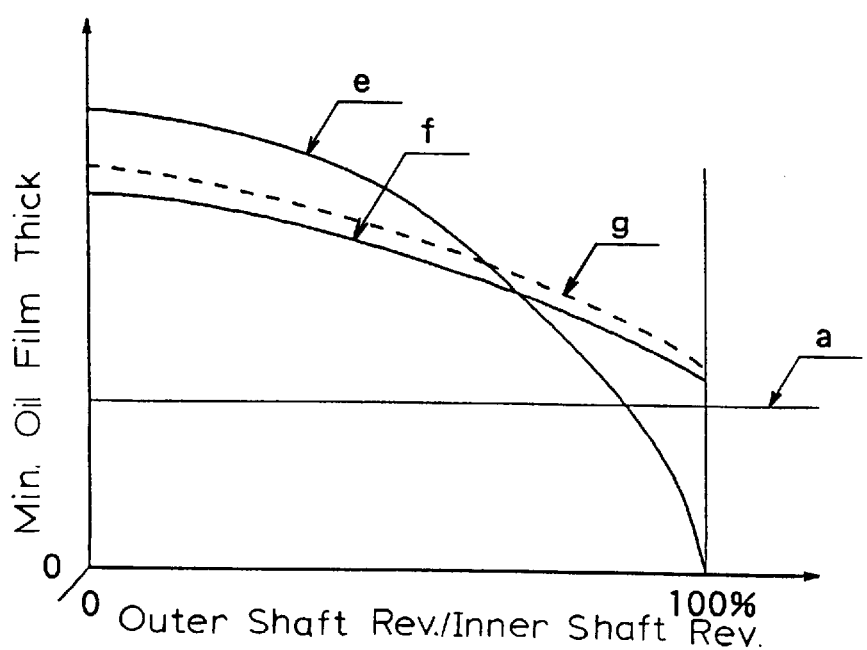
FIG. 24 is a chart showing the relationship between the ratio of number of revolutions and the minimum oil film thickness according to the present invention.
Figure 32:
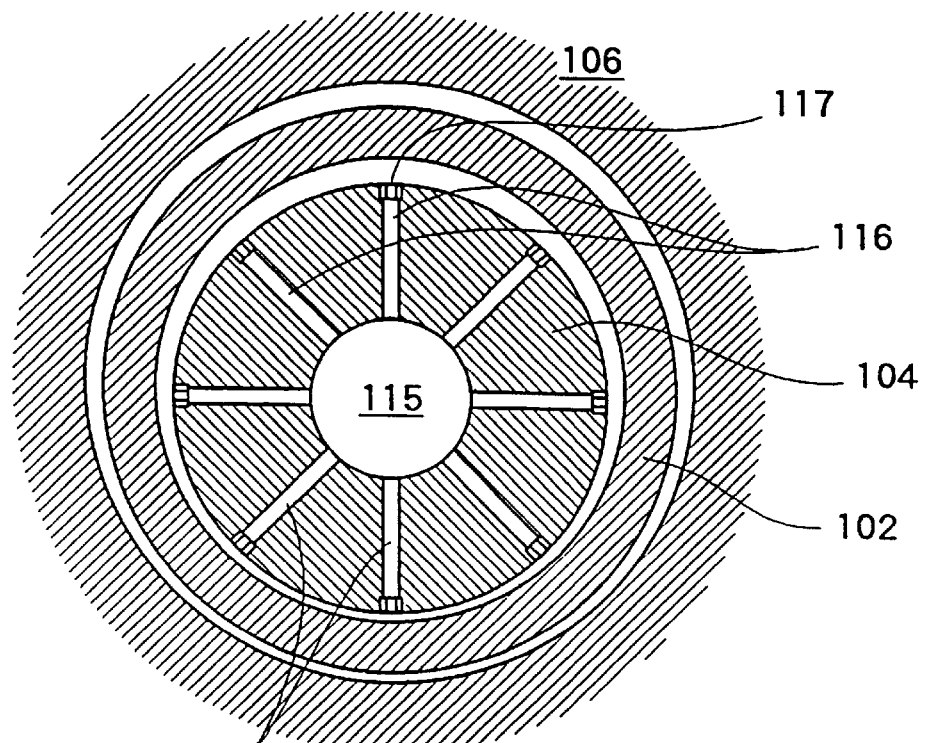
FIG. 32 is a sectional view showing main parts of a stern tube bearing for a contra-rotating propeller based on a static pressure circular bearing according to the prior art.
Figures 33A, 33B:
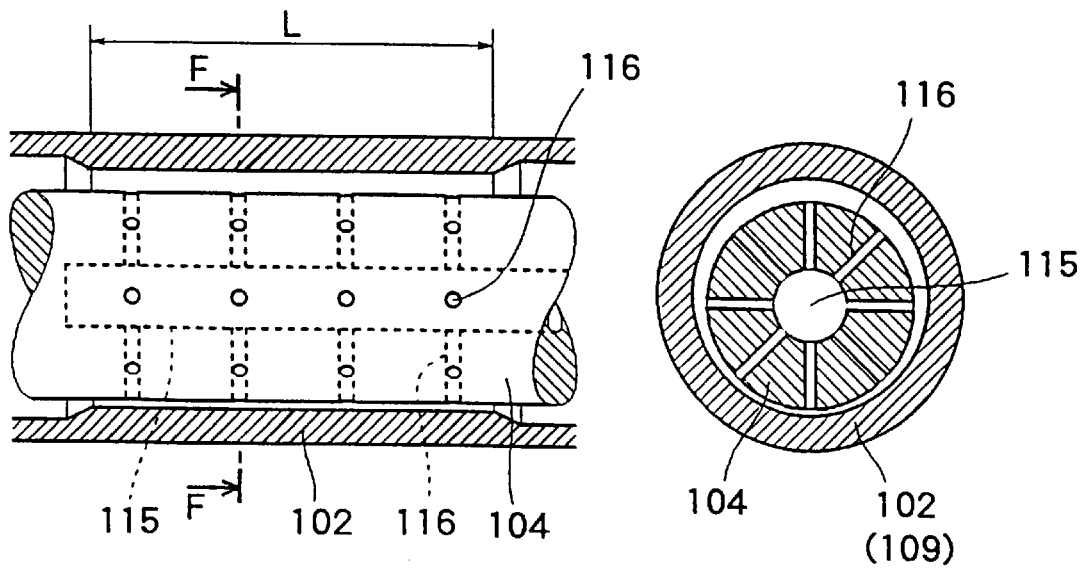
FIG. 33 is a view showing another contra-rotating bearing device for a contra-rotating propeller according to the prior art, wherein (a) is a side sectional view and (b) is a sectional view taken along the line F—F of (a).

(b) Relationship between the ratio of number of revolutions and a minimum oil film thickness FIG. 24 is a chart showing the relationship between the ratio of number of revolutions (the number of revolutions of an outer shaft/the number of revolutions of an inner shaft× 100) and a minimum oil film thickness (load carrying capacity), and the minimum oil film thickness obtained by a dynamic pressure load carrying capacity. In the chart, a line e represents "a circular bearing according to the prior art (FIG. 32)", a line f represents "a bearing without a circular portion on both ends (FIGS. 16 and 19)", and a line g represents "the present invention (having the circular portion on both ends)". In the case where the inner shaft 104 and the contra-rotating bearing are circular as shown in FIG. 32 according to the prior art, the operations of carrying lubrication oil by the inner shaft 104 and the contra-rotating bearing which rotate in mutually opposite directions are offset. Consequently, when the inner shaft 104 and the contra-rotating bearing rotate in mutually opposite directions at quite equal speeds so that the ratio of number of revolutions reaches 100%, the load carrying capacity becomes zero.

As shown in FIGS. 14 and 17 according to the present invention, however, a plurality of concavo-convex shaped portions or non-circular shaped portions such as the tapered land 42 or the lobed bearing surface 43 are formed on the contra-rotating bearing 26. Consequently, even if the inner shaft 23 and the contra-rotating bearing 26 rotate in mutually opposite directions, a clearance is newly formed between the inner shaft 23 and the contra-rotating bearing 26 so that a load carrying capacity can newly be generated by a dynamic pressure with shaft rotation. As shown by a dotted line g of FIG. 24, accordingly, it is found that the circular bearing has a higher load carrying capacity generated by the dynamic pressure in an area where the ratio of number of revolutions is low, and the contra-rotating bearing 26 on which the tapered lands 42 or lobed bearing surfaces 43 are formed has the higher load carrying capacity generated by the dynamic pressure in an area where the ratio of number of revolutions is high, that is, a propeller propulsion efficiency is increased on the contra-rotating propeller shafting 21.

In addition, the dotted line g according to the present invention in which the rear side land face 41B and the front side land face 41I are formed as shown in FIGS. 15 and 18 can obtain the minimum oil film thickness more than the solid line f in which the rear side land face 41B and the front side land face 41F are not formed as shown in FIGS. 16 and 19.

More specifically, the concavo-convex shaped portion such as the tapered land 42 (FIG. 15) or the lobed bearing surface 43 (FIG. 18) is blocked in the axial direction of the contra-rotating bearing 26 by the rear side land face 41B and the front side land face 41F. Consequently, the lubrication oil is stored effectively in the concavo-convex shaped portion so that the generation efficiency of the load carrying capacity obtained by the dynamic pressure and the static pressure can be enhanced.

(c) Relationship between the total length of the circular portions and an oil film thickness FIG. 25 shows the relationship between a total length S of a length SB of the rear side land face 41B and a length SF of the front side land face 41F and the oil film thickness. (a) is a sectional view showing the contra-rotating bearing, wherein u represents "the length of a concavo-convex shaped portion" and L represents "a bearing length". (b) is a chart showing the relationship between the total length of the circular portions and an oil film thickness, wherein a line h represents "the case of only a dynamic pressure", a line i represents "the case where the static pressure is added to the dynamic pressure", and a range j represents the enhancement of the oil film thickness. In the total length S, "0" represents a full tapered land having neither the land face 41B nor the land face 41F, and "1=48/48" represents a full circle. The ratio of number of revolutions of the contra-rotating bearing 26 (outer shaft) to the inner shaft 23 (the number of revolutions of the outer shaft/the number of revolutions of the inner shaft×100) is 65 to 90%.

As shown in the chart (b), the oil film thickness has a maximum value within the range where the total length S is L/48 to 8L/48 (the total length on the after and fore sides) for the axial bearing length L of the contra-rotating bearing 26 in case of the load carrying capacity obtained by only the dynamic pressure. In the case where the static pressure is added, the oil film thickness has a maximum value within the range where the total length S is 4L/48 to 24L/48 (the total length on the after and fore sides). Accordingly, the preferable range is L/48 (a length corresponding to a minimum value obtained in the case where only the dynamic pressure is applied) to 24L/48 (a length corresponding to a maximum value obtained in the case where the static pressure is added). In the case where only the dynamic pressure is applied as shown, the oil film thickness is reduced. If the maximum value is passed, the oil film thickness is reduced more.

For this reason, it is more desirable that the total length S of the rear side land face 41B and the front side land face 41F usually has an intermediate value obtained by applying only the dynamic pressure and adding the static pressure, that is, 2.5L/48 to 16L/48. In order to keep the oil film thickness to some extent also in the case where only the dynamic pressure is applied, 2L/48 to 10L/48 is much more desirable in consideration of the great influence on the dynamic pressure side.

Figure 26:
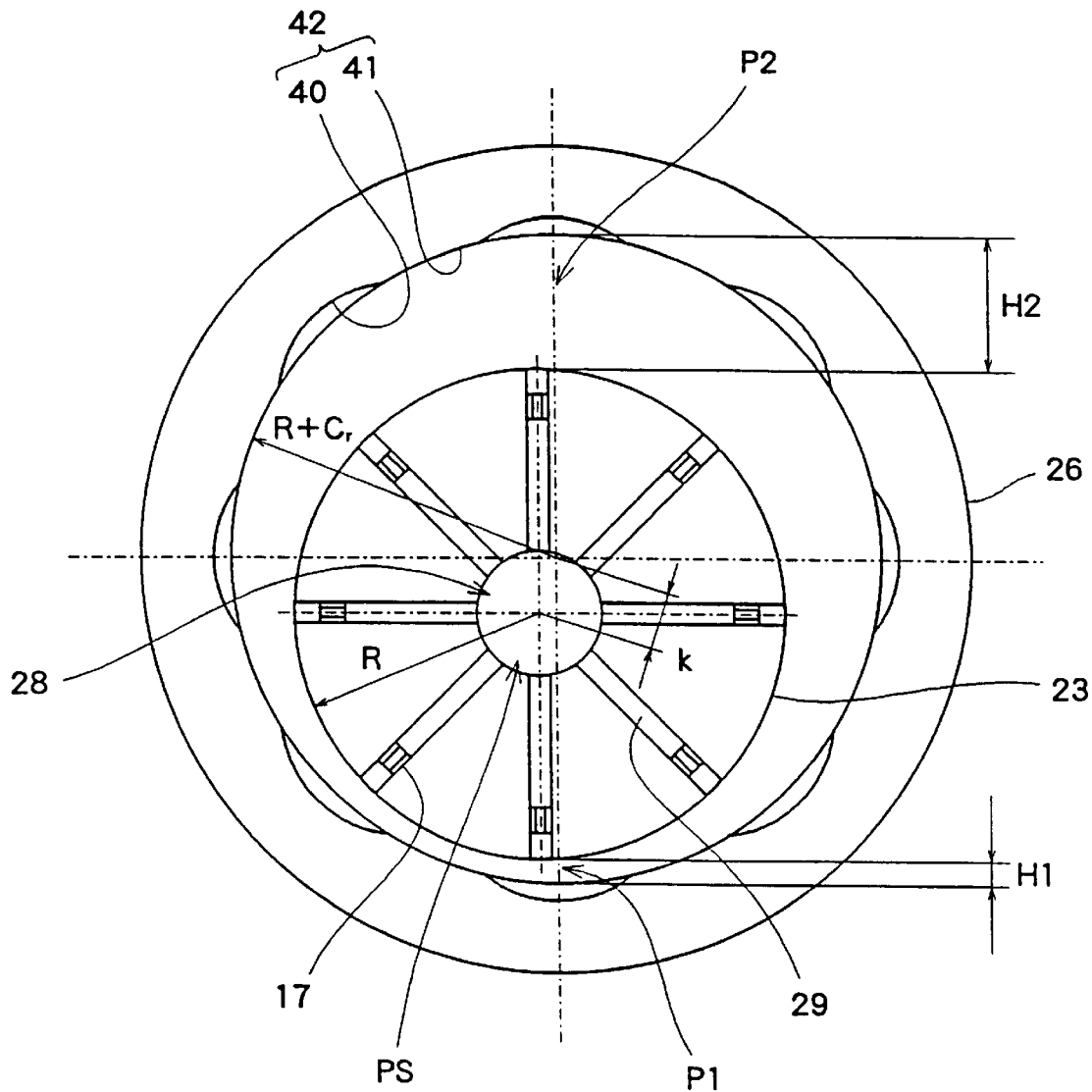
FIG. 26 is a sectional view showing the case where the inner shaft is slightly eccentric to the contra-rotating bearing according to the present invention.
Figure 27:
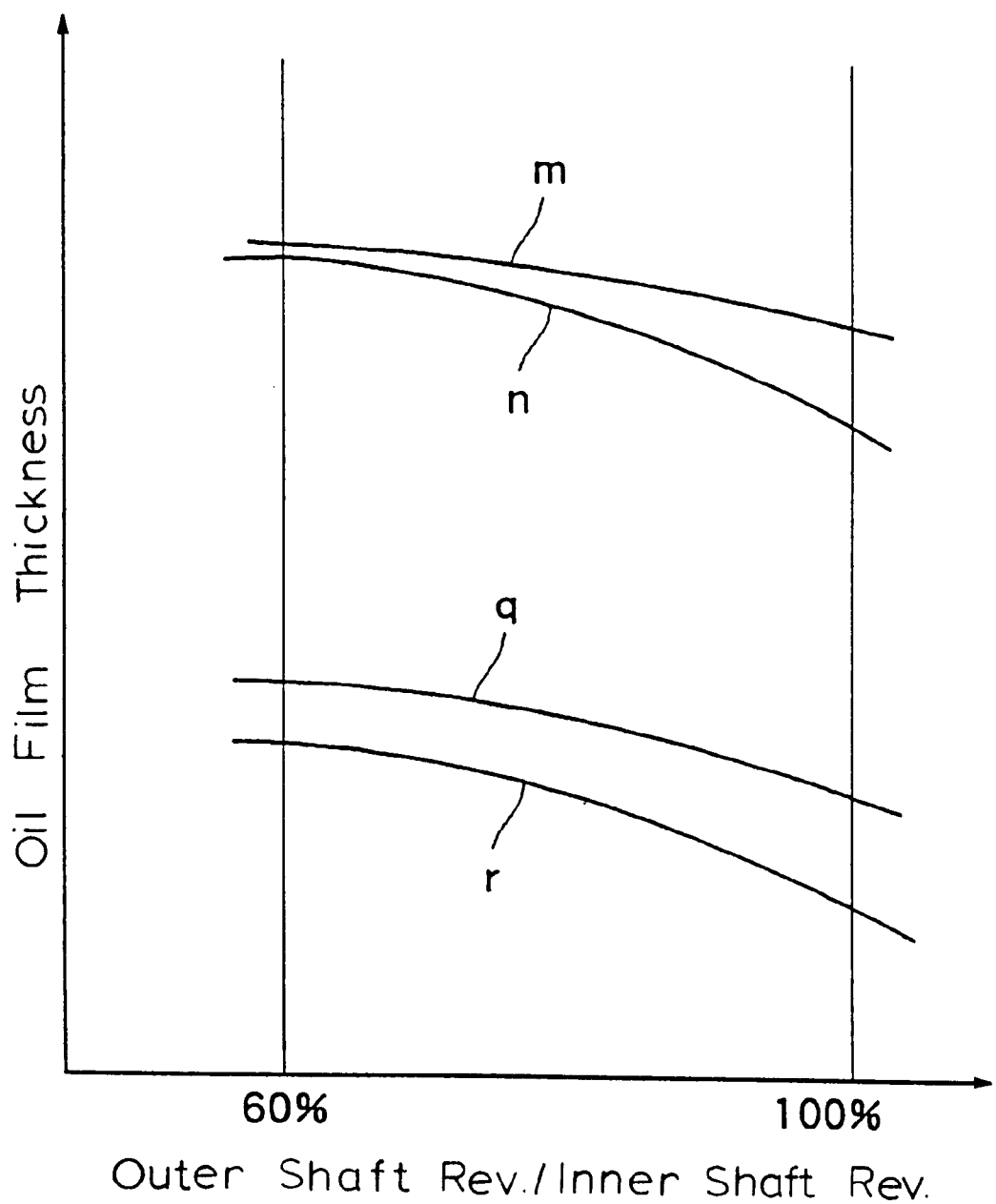
FIG. 27 is a chart showing the relationship between the ratio of number of revolutions and the oil film thickness according to the present invention.
Figure 28:
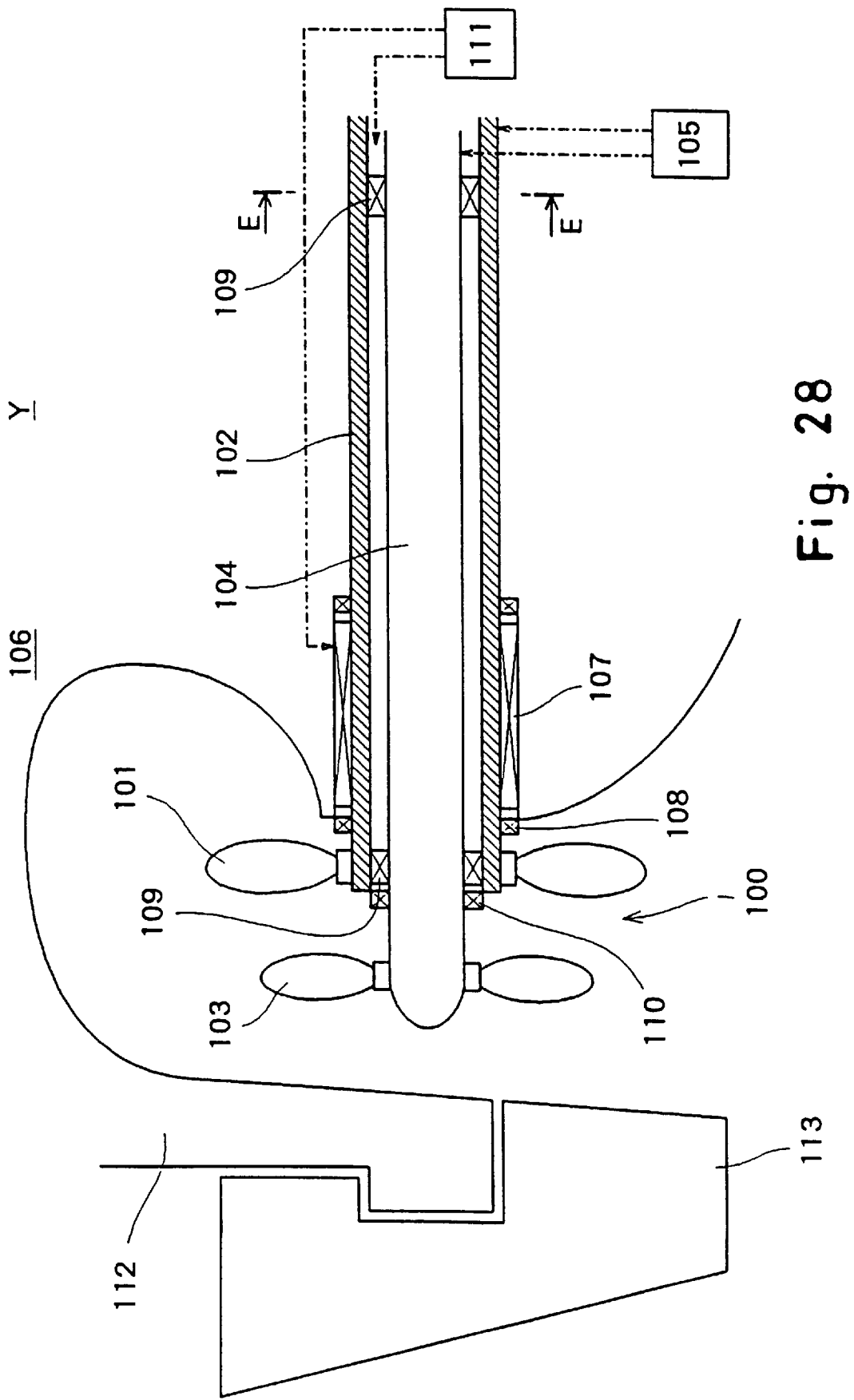
FIG. 28 is a partial broken side view showing a contra-rotating propeller according to the prior art.
Figure 29:
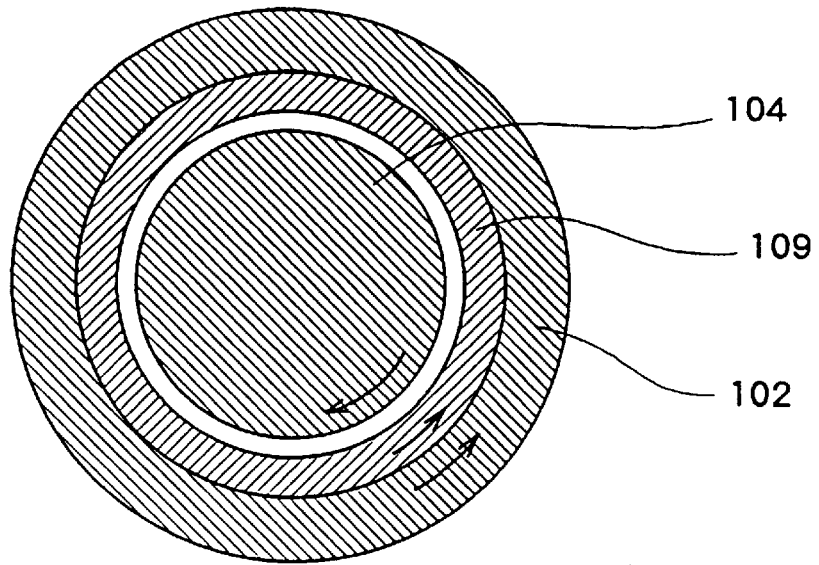
FIG. 29 is a sectional view taken along the line E—E in FIG. 28.
Figure 30:
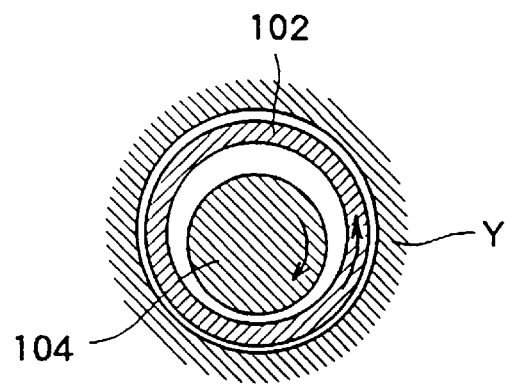
FIG. 30 is a sectional view showing a contra-rotating bearing device for a contra-rotating propeller according to the prior art.
Figure 31:
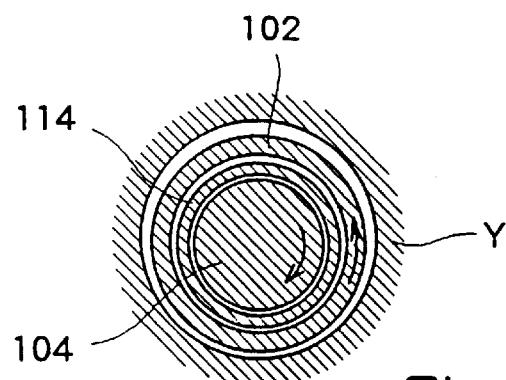
FIG. 31 is a sectional view showing another contra-rotating bearing device for a contra-rotating propeller according to the prior art.

(d) Relationship between a load carrying capacity and the oil feeding pressure of lubrication oil With reference to FIGS. 26 and 27, a load carrying capacity obtained by the static pressure and the oil feeding pressure of lubrication oil will be described below. FIG. 26 is a sectional view in which the core of the inner shaft 23 is slightly eccentric to the contra-rotating bearing 26 in the same manner as in FIGS. 13 and 14. FIG. 27 is a chart showing the relationship between the ratio of number of revolutions and the oil film thickness, and the load carrying capacity obtained by the dynamic pressure and the static pressure. In FIG. 27, a line m represents "an oil feeding pressure of 50 kg/cm2 according to the present invention", a line n represents "an oil feeding pressure of 50 kg/cm2 in the circular bearing (FIG. 32) according to the prior art", a line q represents "an oil feeding pressure of 25 kg/cm2 according to the present invention", and a line r represents "an oil feeding pressure of 25 kg/cm2 in the circular bearing (FIG. 32) according to the prior art".

As shown in FIG. 26, the pressure of the contra-rotating bearing 26 is reduced to P1 on the lower face of the inner shaft 23 and to P2 on the upper face of the inner shaft 23 through a screw 17 having a small hole for orifice formation or capillary tube formation with respect to a supply pressure PS of the lubrication oil. If a spacing between the outer peripheral face of the inner shaft 23 and the inner peripheral face of the land face 41 portion of the contra-rotating bearing 26 is represented by H1 on the lower face and H2 on the upper face, H1 is equal to H2 when the centers of the inner shaft 23 and the contra-rotating bearing 26 correspond to each other and the resistance of the restriction of the screw 17 having a small hole is equal to the resistance of the restriction of the bearing clearance. Consequently, P1 is equal to P2 so that the load carrying capacity becomes zero. When the inner shaft 23 goes downward by an eccentricity k in the drawing, H1 is smaller than H2 and P2 is smaller than P1. Based on a differential pressure (P1–P2), the load carrying capacity is generated.

As shown in FIG. 27, accordingly, the inner shaft 23 having a non-circular shape such as the tapered land 42 or the lobed bearing surface 43 according to the present invention has a higher load carrying capacity generated by the dynamic pressure. Consequently, an equivalent load carrying capacity is obtained at a lower oil feeding pressure so that an oil film thickness can be kept. As compared with the circular bearing according to the prior art shown in FIG. 32, the oil feeding pressure can be reduced more.

Since the present invention has the above-mentioned structure, an excellent bearing function can be obtained as a contra-rotating bearing which supports an inner shaft of a contra-rotating propeller in which the inner shaft and an outer shaft rotate in mutually opposite directions. Consequently, the present invention is useful for the general contra-rotating bearing device for supporting the inner shaft of the contra-rotating propeller, and more particularly suitable for a contra-rotating bearing device for a contra-rotating propeller of a ship which is provided with a large-sized contra-rotating propeller requiring a great load carrying capacity.

What is claimed is:

1. A contra-rotating bearing device for a contra-rotating propeller comprising an inner shaft for driving a rear propeller and an outer shaft for driving a front propeller, both shafts rotating in mutually opposite directions, wherein a hollow portion is provided on the core of the inner shaft to form an oil feed port, a plurality of oil feed holes which are connected with both of the outer peripheral face of the inner shaft within the range of the bearing surface of the inner shaft and the oil feed port are radially provided, and oil grooves each of which includes an inner shaft surface side opening portion of the oil feed hole are provided on the outer peripheral face of the inner shaft, each oil groove having ends thereof.

2. The contra-rotating bearing device for a contra-rotating propeller as defined in claim 1, wherein a plurality of oil feed holes are radially provided in a line, and axial oil grooves each of which includes an inner shaft surface side opening portion of the oil feed hole is provided on the outer peripheral face of the inner shaft.

3. The contra-rotating bearing device for a contra-rotating propeller as defined in claim 1, wherein a plurality of oil feed holes are radially provided, the oil feed holes being axially provided in a plurality of lines, and circumferential oil grooves or axial oil grooves each of which includes an inner shaft surface side opening portion of the oil feed hole are provided on the outer peripheral face of the inner shaft.

4. A contra-rotating bearing device for a contra-rotating propeller comprising an inner shaft for driving a rear propeller and an outer shaft for driving a front propeller, both shafts rotating in mutually opposite directions, wherein a hollow portion is provided on the core of the inner shaft to form an oil feed port, a plurality of oil feed holes which are connected with both of the outer peripheral face of the inner shaft within the range of the bearing surface of the inner shaft and the oil feed port are radially provided, the oil feed holes being axially provided in a plurality of lines which are offset circumferentially, and circumferential oil grooves or axial oil grooves each of which includes an inner shaft surface side opening portion of the oil feed hole are provided on the outer peripheral face of the inner shaft.

5. The contra-rotating bearing device for a contra-rotating propeller as defined in claim 4, wherein the cross sectional area of the oil groove varies substantially along the entire length of the groove from the opening portion of the oil feed hole to ends thereof.

6. A contra-rotating bearing device for a contra-rotating propeller comprising an inner shaft for driving a rear propeller and an outer shaft for driving a front propeller, both shafts rotating in mutually opposite directions, wherein a plurality of tapered lands are formed on the outer peripheral face of the inner shaft within the range of the bearing surface of the inner shaft; and wherein a hollow portion is provided on the core of the inner shaft to form an oil feed port, a plurality of oil feed holes which are connected with both of the outer peripheral face of the inner shaft and the oil feed port are radially provided, and an inner shaft surface side opening portion of the oil feed hole is provided on a valley part of a tapered portion of each of the tapered lands.

7. A contra-rotating bearing device for a contra-rotating propeller comprising an inner shaft for driving a rear propeller and an outer shaft for driving a front propeller, both shafts rotating in mutually opposite directions, wherein the outer peripheral face of the inner shaft is entirely formed of circular arc portions having radius centers different from a center of the inner shaft.

8. A contra-rotating bearing device for a contra-rotating propeller comprising an outer shaft having a front propeller, an inner shaft which is fitted in the outer shaft, rotates in the direction opposite to the outer shaft, and has a rear propeller, and a contra-rotating bearing provided between the inner shaft and the outer shaft, wherein an oil feed port is provided by forming a hollow portion on the inner shaft, and a plurality of radial oil feed holes which are connected with the oil feed port are formed, lubrication oil which generates a static pressure load carrying capacity is fed from the inner shaft to the inner peripheral face of the bearing through the oil feed port and the radial oil feed holes, a plurality of concavo-convex shaped portions which generate a dynamic pressure load carrying capacity and a plurality of land faces concentric with the inner shaft are formed on and alternate circumferentially about the inner peripheral face of the bearing in the axial direction of the bearing, and circular portions are provided on both ends of the concavo-convex shaped portions provided in the axial direction of the bearing.

9. A contra-rotating bearing device for a contra-rotating propeller comprising an outer shaft having a front propeller, an inner shaft which is fitted in the outer shaft, rotates in the direction opposite to the outer shaft, and has a rear propeller, and a contra-rotating bearing provided between the inner shaft and the outer shaft, wherein an oil feed port is provided by forming a hollow portion on the inner shaft, and a plurality of radial oil feed holes which are connected with the oil feed port are formed, lubrication oil which generates a static pressure load carrying capacity is fed from the inner shaft to the inner peripheral face of the bearing through the oil feed port and the radial oil feed holes, a plurality of concavo-convex shaped portions which generate a dynamic pressure load carrying capacity are formed on the inner peripheral face of the bearing in the axial direction of the bearing, and circular portions are provided on both ends of the concavo-convex shaped portions provided in the axial direction of the bearing, and wherein the radial oil feed holes are provided backward from a central position in the axial direction of the bearing by L/6 to L/4 for a length L of the bearing.

10. A contra-rotating bearing device for a contra-rotating propeller comprising an outer shaft having a front propeller, an inner shaft which is fitted in the outer shaft, rotates in the direction opposite to the outer shaft, and has a rear propeller, and a contra-rotating bearing provided between the inner shaft and the outer shaft, wherein an oil feed port is provided by forming a hollow portion on the inner shaft, and a plurality of radial oil feed holes which are connected with the oil feed port are formed, lubrication oil which generates a static pressure load carrying capacity is fed from the inner shaft to the inner peripheral face of the bearing through the oil feed port and the radial oil feed holes, a plurality of concavo-convex shaped portions which generate a dynamic pressure load carrying capacity are formed on the inner peripheral face of the bearing in the axial direction of the bearing, and circular portions are provided on both ends of the concavo-convex shaped portions provided in the axial direction of the bearing, and wherein the radial oil feed holes are provided backward from a central position in the axial direction of the bearing by L/6 to L/4 for a length L of the bearing.

11. A contra-rotating bearing device for a contra-rotating propeller comprising an outer shaft having a front propeller, an inner shaft which is fitted in the outer shaft, rotates in the direction opposite to the outer shaft, and has a rear propeller, and a contra-rotating bearing provided between the inner shaft and the outer shaft, wherein an oil feed port is provided by forming a hollow portion on the inner shaft, and a plurality of radial oil feed holes which are connected with the oil feed port are formed, lubrication oil which generates a static pressure load carrying capacity is fed from the inner shaft to the inner peripheral face of the bearing through the oil feed port and the radial oil feed holes, a plurality of concavo-convex shaped portions which generate a dynamic pressure load carrying capacity are formed on the inner peripheral face of the bearing in the axial direction of the bearing, and circular portions are provided on both ends of the concavo-convex shaped portions provided in the axial direction of the bearing, and wherein the total length of the circular portions is L/48 to 24L/48 for the length L of the bearing.

12. A contra-rotating bearing device for a contra-rotating propeller comprising an outer shaft having a front propeller, an inner shaft which is fitted in the outer shaft, rotates in the direction opposite to the outer shaft, and has a rear propeller, and a contra-rotating bearing provided between the inner shaft and the outer shaft, wherein an oil feed port is provided by forming a hollow portion on the inner shaft, and a plurality of radial oil feed holes which are connected with the oil feed port are formed, lubrication oil which generates a static pressure load carrying capacity is fed from the inner shaft to the inner peripheral face of the bearing through the oil feed port and the radial oil feed holes, a plurality of concavo-convex shaped portions which generate a dynamic pressure load carrying capacity are formed on the inner peripheral face of the bearing in the axial direction of the bearing, and circular portions are provided on both ends of the concavo-convex shaped portions provided in the axial direction of the bearing, and wherein the total length of the circular portions is 2L/48 to 10L/48 for the length L of the bearing.

13. The contra-rotating bearing device for a contra-rotating propeller as defined in any of claims 1 to 3, wherein the cross sectional area of the oil groove varies substantially along the entire length of the groove from the opening portion of the oil feed hole to the ends thereof.

* * * * *

UNITED STATES PATENT AND TRADEMARK OFFICE
CERTIFICATE OF CORRECTION

PATENT NO.    : 6,056,509
DATED         : May 2, 2000
INVENTOR(S)   : Mikihiko Nakayama, et al.

It is certified that error appears in the above-identified patent and that said Letters Patent is hereby corrected as shown below:

[22] PCT filed September 4, 1995

[73] Assignee: Kawasaki Jukogyo Kabushiki Kaisha, Sumitomo Heavy Industries, Ltd., NKK Corporation, Hitachi Zosen Corporation, and Mitsui Engineering & Shipbuilding Co., Ltd.

Signed and Sealed this

Fifteenth Day of May, 2001

*Attest:*

NICHOLAS P. GODICI

*Attesting Officer*     *Acting Director of the United States Patent and Trademark Office*